US012377676B2

(12) United States Patent
Sada et al.

(10) Patent No.: US 12,377,676 B2
(45) Date of Patent: Aug. 5, 2025

(54) FOLDER FOLDER

(71) Applicant: ACCO Brands Corporation, Lake Zurich, IL (US)

(72) Inventors: Denise E. Sada, Franklin, TN (US); Kevin W. Witter, Fort Collins, CO (US)

(73) Assignee: ACCO Brands Corporation, Lake Zurich, IL (US)

(*) Notice: Subject to any disclaimer, the term of this patent is extended or adjusted under 35 U.S.C. 154(b) by 335 days.

(21) Appl. No.: 16/715,370

(22) Filed: Dec. 16, 2019

(65) Prior Publication Data

US 2020/0114678 A1 Apr. 16, 2020

Related U.S. Application Data

(63) Continuation of application No. 13/377,063, filed as application No. PCT/US2010/039512 on Jun. 22, 2010, now Pat. No. 10,507,682.

(Continued)

(51) Int. Cl.
*B42F 7/02* (2006.01)
*B42D 1/00* (2006.01)
(Continued)

(52) U.S. Cl.
CPC .................. *B42F 7/02* (2013.01); *B42D 1/00* (2013.01); *B42D 3/12* (2013.01); *B42D 9/002* (2013.01);
(Continued)

(58) Field of Classification Search
CPC .... B42F 7/02; B42F 7/06; B42F 7/025; B42F 13/0033; B42F 21/04; B42F 13/22;
(Continued)

(56) References Cited

U.S. PATENT DOCUMENTS 2,865,659 A 12/1958 Zimmermann
3,680,969 A 8/1972 Gorman
(Continued)

FOREIGN PATENT DOCUMENTS

CN 2782400 5/2006
CN 202727654 2/2013
(Continued)

OTHER PUBLICATIONS

International Search Report and International Preliminary Report for PCT/US2010/039512, filed Jun. 22, 2010.
(Continued)

*Primary Examiner* — Justin V Lewis
(74) *Attorney, Agent, or Firm* — Fitch, Even, Tabin & Flannery LLP

(57) ABSTRACT

A bound component has a front cover attached to a spine attached to a rear cover, a binding mechanism, and a binder extension attached to either cover. The binder extension folds inwardly in its closed position and has pockets. Also disclosed is a bound component having a front cover attached to a spine attached to a rear cover, a binding mechanism and one or more pockets attached to either cover. The pocket may have one or more closure flaps and may be expandable. Also disclosed is a folder having one or more bound edges and one or more free edges, one or more folder tabs extending from one or more free edges, and a plurality of pages bound to the folder. The pages may be bound to the folder using adhesive, string, staples or other attachment mechanisms. The folder may fit within a traditional file drawer.

6 Claims, 35 Drawing Sheets

Related U.S. Application Data

(60) Provisional application No. 61/222,611, filed on Jul. 2, 2009, provisional application No. 61/219,169, filed on Jun. 22, 2009.

(51) Int. Cl.

| | |
|---|---|
| ***B42D 3/12*** | (2006.01) |
| ***B42D 9/00*** | (2006.01) |
| ***B42F 7/06*** | (2006.01) |
| ***B42F 11/00*** | (2006.01) |
| ***B42F 13/00*** | (2006.01) |
| ***B42F 13/16*** | (2006.01) |
| ***B42F 13/22*** | (2006.01) |
| ***B42F 21/02*** | (2006.01) |
| ***B42F 21/04*** | (2006.01) |
| ***B42F 21/06*** | (2006.01) |

(52) U.S. Cl.
CPC ................ *B42F 7/025* (2013.01); *B42F 7/06* (2013.01); *B42F 7/065* (2013.01); *B42F 11/00* (2013.01); *B42F 13/0033* (2013.01); *B42F 13/165* (2013.01); *B42F 13/22* (2013.01); *B42F 21/02* (2013.01); *B42F 21/04* (2013.01); *B42F 21/06* (2013.01); *B42P 2241/02* (2013.01)

(58) Field of Classification Search
CPC ........ B42F 13/165; B42F 21/02; B42F 11/00; B42F 21/06; B42F 7/065; B42D 3/12; B42D 1/00; B42D 9/002; B42P 2241/02
USPC ......... 402/4, 70, 73, 74, 75, 76, 77, 78, 502
See application file for complete search history.

(56) References Cited

U.S. PATENT DOCUMENTS

| | | | | |
|---|---|---|---|---|
| 4,141,162 | A | 2/1979 | Mascolo | |
| 4,150,844 | A | 4/1979 | Yoshizawa | |
| 4,629,349 | A * | 12/1986 | Pitts | B42D 3/00 281/31 |
| 4,819,962 | A | 4/1989 | Takai | |
| 4,848,798 | A | 7/1989 | Moor | |
| 4,880,327 | A | 11/1989 | Sanabria | |
| 5,283,862 | A | 2/1994 | Lund | |
| 5,351,992 | A | 10/1994 | Chilson et al. | |
| 5,370,419 | A | 12/1994 | Takayama | |
| 5,378,022 | A | 1/1995 | French et al. | |
| 5,660,514 | A | 8/1997 | Wilson | |
| 5,674,021 | A | 10/1997 | Hutnick | |
| 5,711,627 | A | 1/1998 | Chapman | |
| 5,727,894 | A | 3/1998 | Covey | |
| 5,931,297 | A | 8/1999 | Weill et al. | |
| 5,944,352 | A | 8/1999 | Crouch et al. | |
| 5,954,170 | A | 9/1999 | Chisholm | |
| 6,017,062 | A * | 1/2000 | White | B42D 5/042 281/31 |
| 6,017,164 | A | 1/2000 | Abbott | |
| 6,024,508 | A | 2/2000 | Lippeth et al. | |
| 6,079,528 | A | 6/2000 | Moor | |
| 6,086,281 | A | 7/2000 | Covey | |
| 6,089,607 | A | 7/2000 | Keeney et al. | |
| 6,196,749 | B1 | 3/2001 | Chizmar | |
| 6,241,414 | B1 * | 6/2001 | Wien | B42F 13/0006 281/20 |
| 6,371,678 | B1 | 4/2002 | Chizmar | |
| 6,371,679 | B1 | 4/2002 | Peleman | |
| 6,431,779 | B1 | 8/2002 | Moor et al. | |
| 6,431,780 | B2 | 8/2002 | Moor et al. | |
| 6,439,611 | B1 | 8/2002 | Chen | |
| D463,487 | S | 9/2002 | Savoy | |
| 6,558,062 | B1 * | 5/2003 | Wyant | B42F 13/16 281/21.1 |
| 6,659,675 | B2 | 12/2003 | Rew | |
| 6,666,610 | B1 | 12/2003 | Moor et al. | |
| 6,702,501 | B2 | 3/2004 | Chizmar | |
| 6,739,784 | B1 | 5/2004 | Tims et al. | |
| 6,739,785 | B2 | 5/2004 | Moor | |
| 6,773,195 | B2 | 8/2004 | Tims | |
| 6,945,399 | B1 | 9/2005 | Ong | |
| 7,021,853 | B2 | 4/2006 | Hall et al. | |
| 7,031,148 | B1 | 4/2006 | Lin | |
| 7,063,477 | B2 | 6/2006 | Busam et al. | |
| D559,308 | S | 1/2008 | Sakaguchi | |
| D559,309 | S | 1/2008 | Rydzewski | |
| 7,347,640 | B2 | 3/2008 | Chizmar | |
| 7,389,872 | B2 | 6/2008 | Wheeler et al. | |
| D577,766 | S | 9/2008 | Rydzewski | |
| D583,863 | S | 12/2008 | Savoy | |
| D599,850 | S | 9/2009 | Savoy | |
| D599,851 | S | 9/2009 | Savoy | |
| D604,360 | S | 11/2009 | Savoy | |
| 7,628,426 | B1 | 12/2009 | Rowe et al. | |
| 7,717,638 | B2 | 5/2010 | Harris et al. | |
| 7,819,432 | B2 | 10/2010 | Rowe et al. | |
| 8,033,747 | B2 | 10/2011 | Busam et al. | |
| 9,902,190 | B2 | 2/2018 | Hobbs | |
| 2002/0050708 | A1 | 5/2002 | Conklin et al. | |
| 2002/0051677 | A1 | 5/2002 | Moor | |
| 2002/0074791 | A1 | 6/2002 | Wien et al. | |
| 2002/0170948 | A1 | 11/2002 | Brennan | |
| 2004/0079014 | A1 | 4/2004 | Marchand | |
| 2004/0253046 | A1 * | 12/2004 | Africa | B42F 13/0006 402/73 |
| 2005/0016647 | A1 * | 1/2005 | Carey | A45C 1/08 150/113 |
| 2005/0100395 | A1 * | 5/2005 | Brann | B42F 13/0006 402/73 |
| 2005/0158113 | A1 | 7/2005 | Wehmeyer | |
| 2005/0175390 | A1 | 8/2005 | Wehmeyer | |
| 2005/0207827 | A1 * | 9/2005 | Busam | B42F 7/08 402/73 |
| 2006/0039745 | A1 | 2/2006 | Menders | |
| 2006/0245822 | A1 | 11/2006 | Lockhart | |
| 2007/0043741 | A1 | 2/2007 | Rydzewski | |
| 2007/0120356 | A1 | 5/2007 | Savoy | |
| 2007/0172309 | A1 * | 7/2007 | Witter | B42F 7/06 402/73 |
| 2007/0297849 | A1 * | 12/2007 | Merzon | B42F 13/16 206/232 |
| 2008/0226385 | A1 | 9/2008 | Ruble | |
| 2008/0304901 | A1 | 12/2008 | Seman | |
| 2009/0003925 | A1 | 1/2009 | Chizmar | |
| 2009/0091117 | A1 | 4/2009 | Shoffstall-Ridley | |
| 2009/0236842 | A1 | 9/2009 | Rowe et al. | |
| 2009/0236843 | A1 | 9/2009 | Rowe et al. | |
| 2010/0193576 | A1 | 8/2010 | Sierra | |
| 2010/0226708 | A1 | 9/2010 | Bogal | |
| 2010/0300911 | A1 | 12/2010 | Yamada et al. | |
| 2011/0057433 | A1 | 3/2011 | Savoy et al. | |
| 2011/0079636 | A1 | 4/2011 | Christensen et al. | |

FOREIGN PATENT DOCUMENTS

| | | |
|---|---|---|
| CN | 206781342 | 12/2017 |
| DE | 202010001605 | 4/2010 |
| EP | 1884373 | 2/2008 |
| EP | 1202866 | 12/2010 |
| JP | 5693620 | 4/2015 |
| WO | 9727068 | 7/1997 |
| WO | 0054987 | 9/2000 |
| WO | 0054988 | 9/2000 |

(56) References Cited

FOREIGN PATENT DOCUMENTS

| | | |
|---|---|---|
| WO | 0054989 | 9/2000 |
| WO | 02061736 | 8/2002 |

OTHER PUBLICATIONS

Office Action issued in Canadian Application No. 2,765,109 on Oct. 30, 2014.

* cited by examiner

FOLDER FOLDER

CROSS-REFERENCE TO RELATED APPLICATIONS

This application is a continuation of U.S. patent application Ser. No. 13/377,063, filed Dec. 8, 2011, now U.S. Pat. No. 10,507,682, issued Dec. 17, 2019, which is a U.S. national phase application filed under 35 U.S.C. § 371 of International Application No. PCT/US2010/039512, filed Jun. 22, 2010, designating the United States, which claims priority to U.S. Provisional Applications 61/219,169, filed June 22, 2009, and 61/222,611, filed Jul. 2, 2009, all of which are hereby incorporated by reference in their entireties.

BACKGROUND

Binders are typically used in home, office and school settings to provide portable storage devices for information. Typically they have a front and back cover connected at the spine and a binding mechanism attached to the spine. The binders can hold other notebooks, paper, pencil/pen pouches or the like.

While the binders generally contain a lot of information it is not always easy to access multiple documents at once within the traditional binder design. This is because one generally can only look at the front side of one document contained within the binder at a time. In order to view multiple documents a user must flip between spots in the binder or remove the needed pages from binder and risk damaging, loosing or messing up the organization of the binder.

Accordingly there is a need for a binder that allows a user to view multiple documents at one time while still holding them all securely within the binder.

In addition, having a pen and pencil pouch located within the binder can prevent the binder from closing as much as possible and prevent the pages contained within from laying flat. In addition it is not always convenient or possible to access these pouches when needed.

Accordingly there is a need for an external storage pocket to hold documents, calculators, writing instruments, rulers, compasses, planners, schedules, pouches to hold writing utensils or the like.

File folders also are typically used in home or office settings for various purposes, mainly focused on the storage and retrieval of information. Typically they have a tab for quick identification of the subject matter contained within the file. However, these folders generally are used to hold loose papers or documents.

Loose papers may slide out of the file folders and get misplaced. Accordingly, file folders have been designed to contain temporary binding features such as brads within the folder to hold hole punched papers in place. However, the temporary binding feature is inconvenient as not all paper comes with holes punched at the right location and distances to be easily inserted in such a folder. In addition, there are specific hole-punches required to get the distance correct on the paper for the spacing of the brads or other connectors.

Accordingly, there is a need for a file folder with permanently attached pages for containing and organizing information.

SUMMARY

The present application covers a bound component for storing information and including a binder with one or more covers having one or more bound edges and one or more free edges and one or more additional binder sections added to a free edge of the one or more binder covers to provide an additional storage place or recording place for information. It also covers a bound component having the binding component along a free edge and two additional binder panels connected thereto.

In another embodiment, a bound component for storing information, includes a binder having one of more covers having one or more bound edges and having one or more free edges and having an external facing side and an internal facing side and wherein the external side of the one or more covers has one or more pockets to provide an additional storage location.

The application also covers a bound component for storing information and including a folder with one or more covers having one or more bound edges, one or more free edges, a spine and a tab extending from one or more free edges and a plurality of pages bound to the inside of the folder. It also covers a bound component for storing information having one or more covers with one or more bound edges and one or more free edges, and one or more tabs extending from the one or more bound edges.

In another embodiment, the application covers a bound component for storing information and including a folder having one or more bound edges, one or more free edges and a tab extending from one or more free rear cover edges and an indention cut into one or more free front cover edges, a plurality of pages bound to the inside of the folder and it may have one or more pages of the plurality of pages with a designated information area that aligns with the cut in portion on the folder cover.

In yet another embodiment the bound component may have one or more internal dividers as well to further organize information. In still another embodiment one or more additional file side sections may be added to one or more free edges of the front and/or rear cover. Such additional file section may have a plurality of pages attached to it as well. Other objectives, advantages and novel features of the products disclosed herein will become more apparent from the following detailed description.

DETAILED DESCRIPTION

Figure 1:
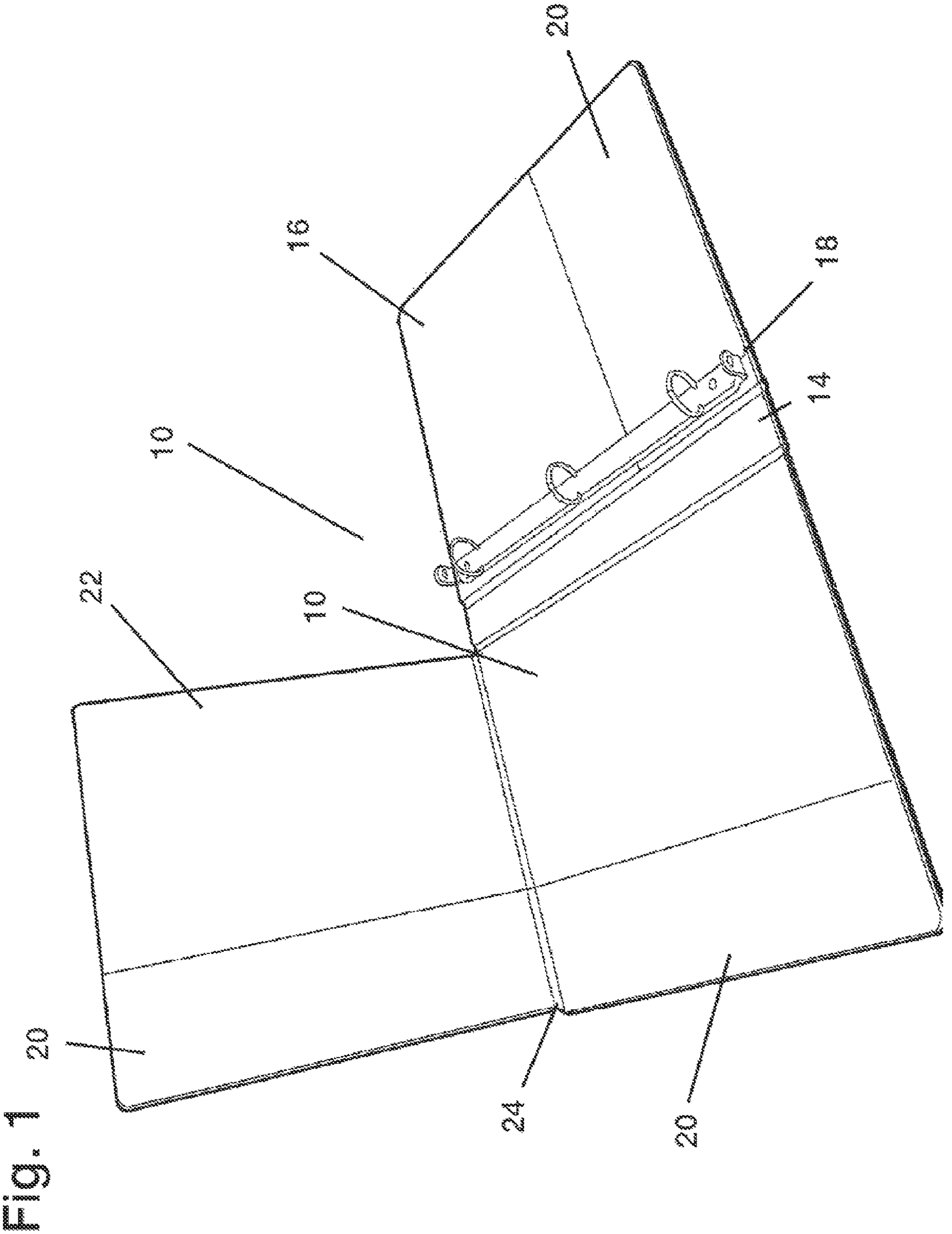
FIG. 1 shows a bound component having a front cover, a spine, a binding mechanism, a back cover and a binder extension connected to a free edge of said front cover.
Figure 2:
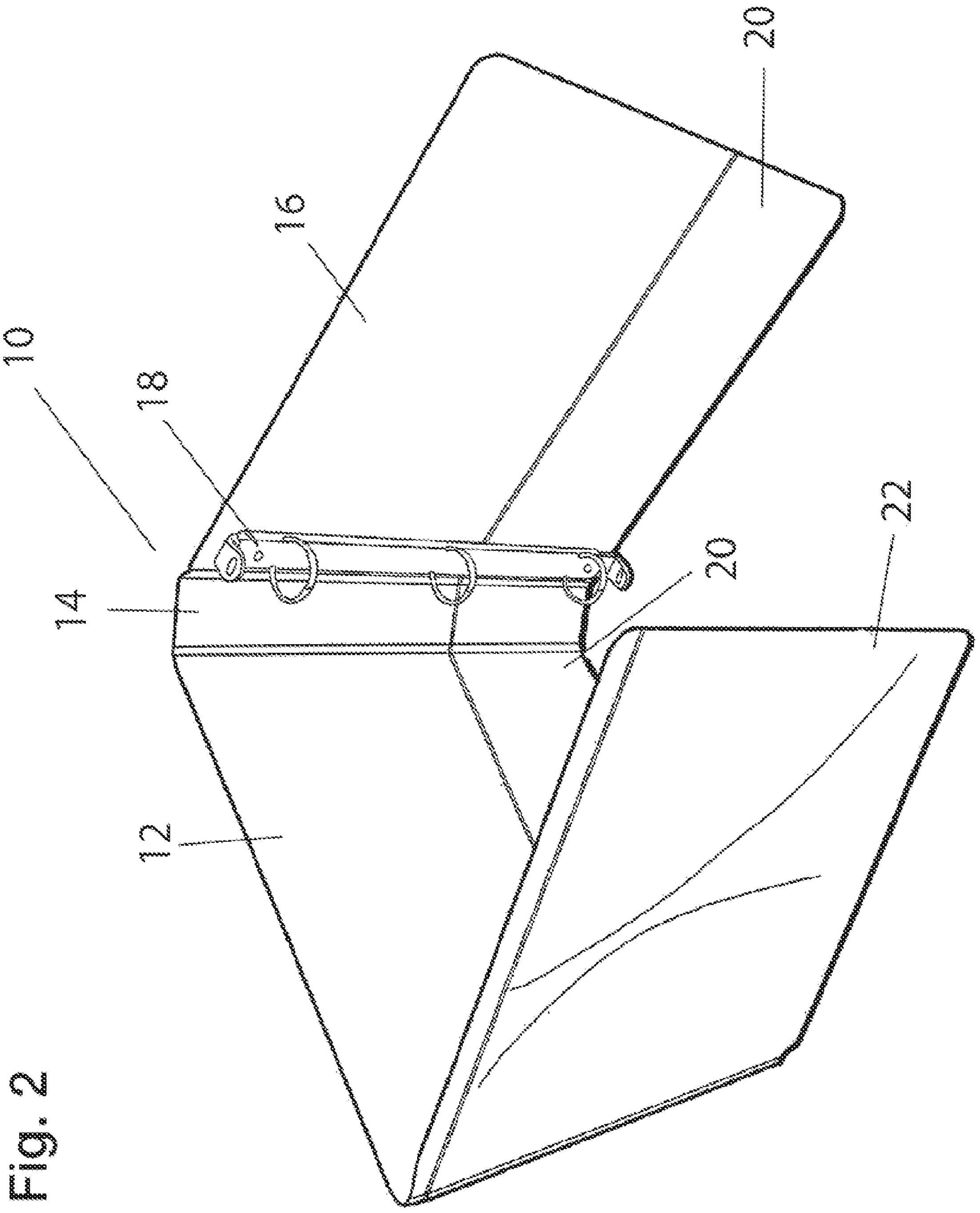
FIG. 2 shows a partially open view of a bound component similar to FIG. 1 but with the binder extension connected at a different free edge of the front cover.

As shown in FIGS. 1-3, in one embodiment a bound component generally designated as 10 may include a front cover 12, a spine 14, a back cover 16 and one or more binding mechanisms 18. The terms "back" and "rear" are used interchangeably herein for describing certain features such as the back cover. Said front cover 12 and said back cover 16 may be pivotally coupled to said spine 14. Said front cover 12 and said back cover 16 have a bound edge where they connect with the spine 14. Said front cover 12 and said back cover 16 have free edges where they are not connected to the spine 14. Said binding mechanism 18 may be located on the spine 14 or as illustrated in FIG. 1 adjacent to spine 14 on back cover 16 or as illustrated in FIG. 3B along a free edge. It is to be understood that the binding mechanism may include rings, brads, clips, cords, ribbon, elastic connectors, heat sealing, welding, adhesives, staples, rivets, sewing, a combination of these and/or the like based on manufacturing preferences.

Looking at FIGS. 1-3, front cover 12 may have one or more pockets 20. It is to be understood that back cover 16 may have one or more pockets as well. The one or more pockets may be top loading, bottom loading and/or side loading based on manufacturing preferences. The one or more pockets may be located at one or more corners of the front cover 12 or the back cover 16. The one or more pockets may be designed to hold different sized note cards or pages. The one or more pockets may be up to 1/10 the size of the front cover 12 or back cover 16; up to 1/4 the size of the front cover 12 or back cover 16; up to 1/2 the size of the front cover 12 or back cover 16; and/or up to 3/4 the size of the front cover 12 or back cover 16. The one or more pockets 20 may include a variety of different sized and/or shaped pockets and may be positioned in a variety of locations including overlapping pockets, pockets within pockets, and/or pockets on top of other pockets. The one or more pockets size, shape and or location will be chosen based on manufacturing preferences. The pockets 20 can be made of vinyl, poly propylene, fabric, polyethylene, cardboard and/or paper, leather, or other materials.

Figure 3A:
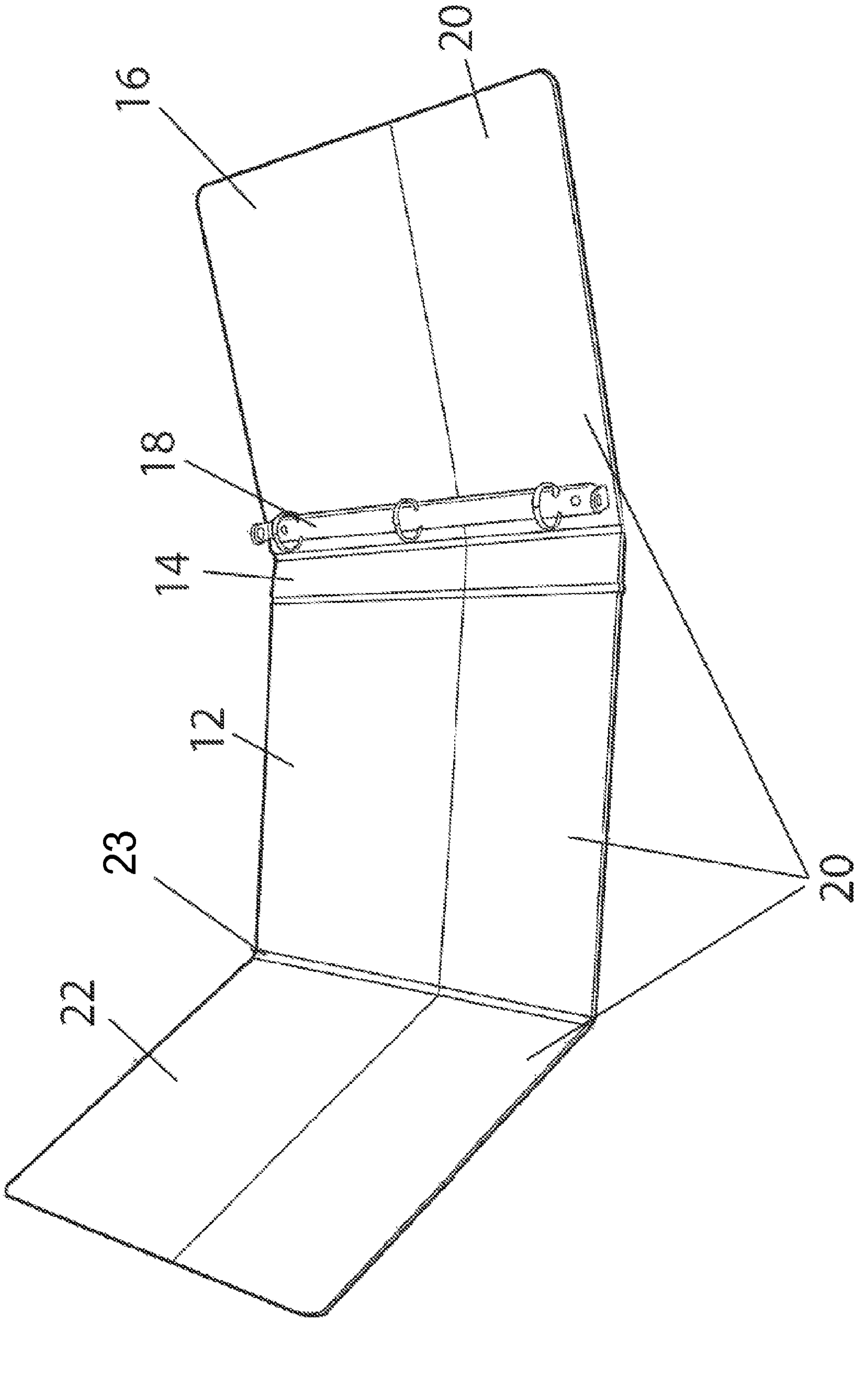
FIGS. 3A-3E show open views of the bound component illustrated in FIG. 2 and variations thereon.
Figure 3B:
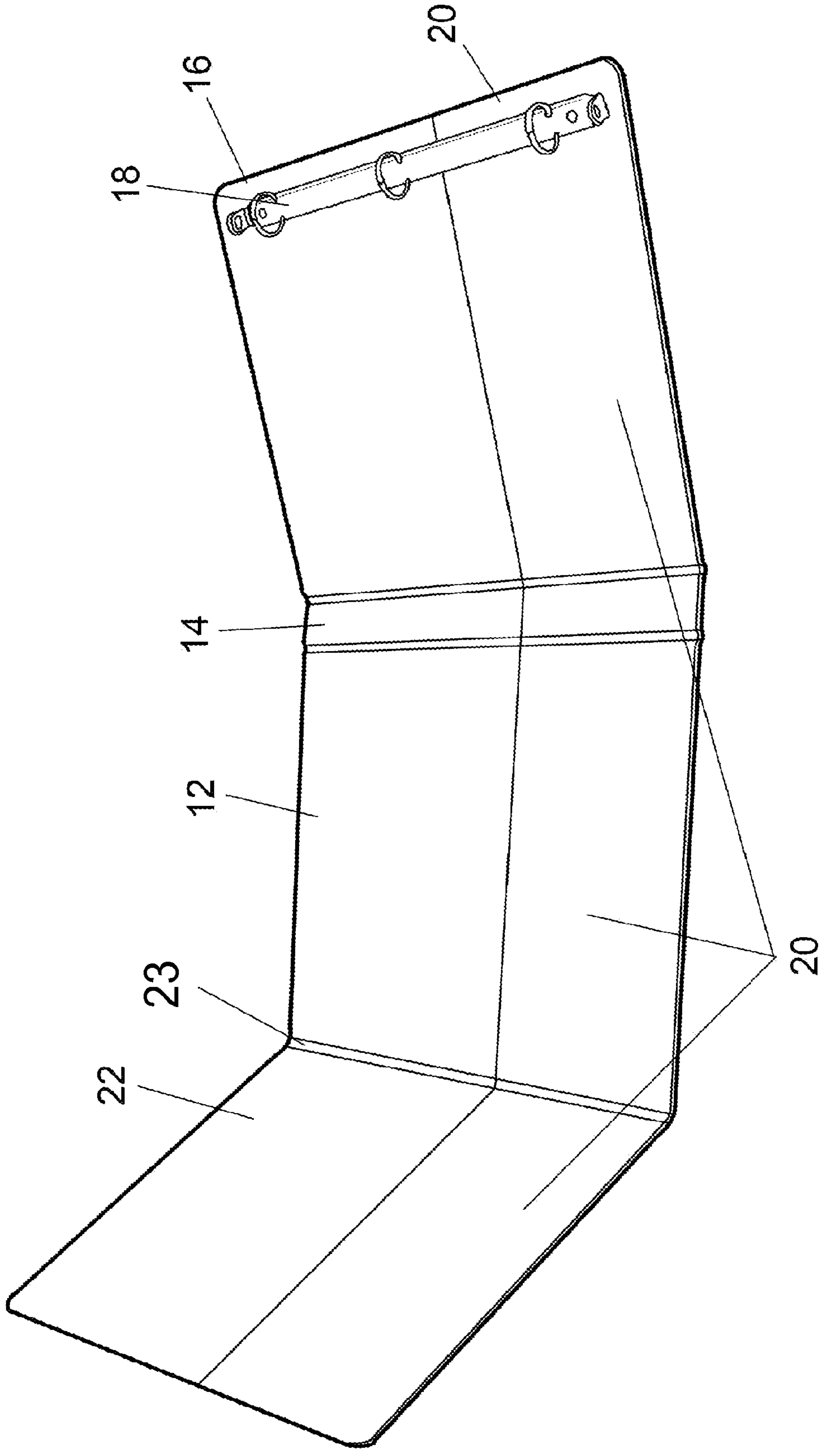
Figure 3C:
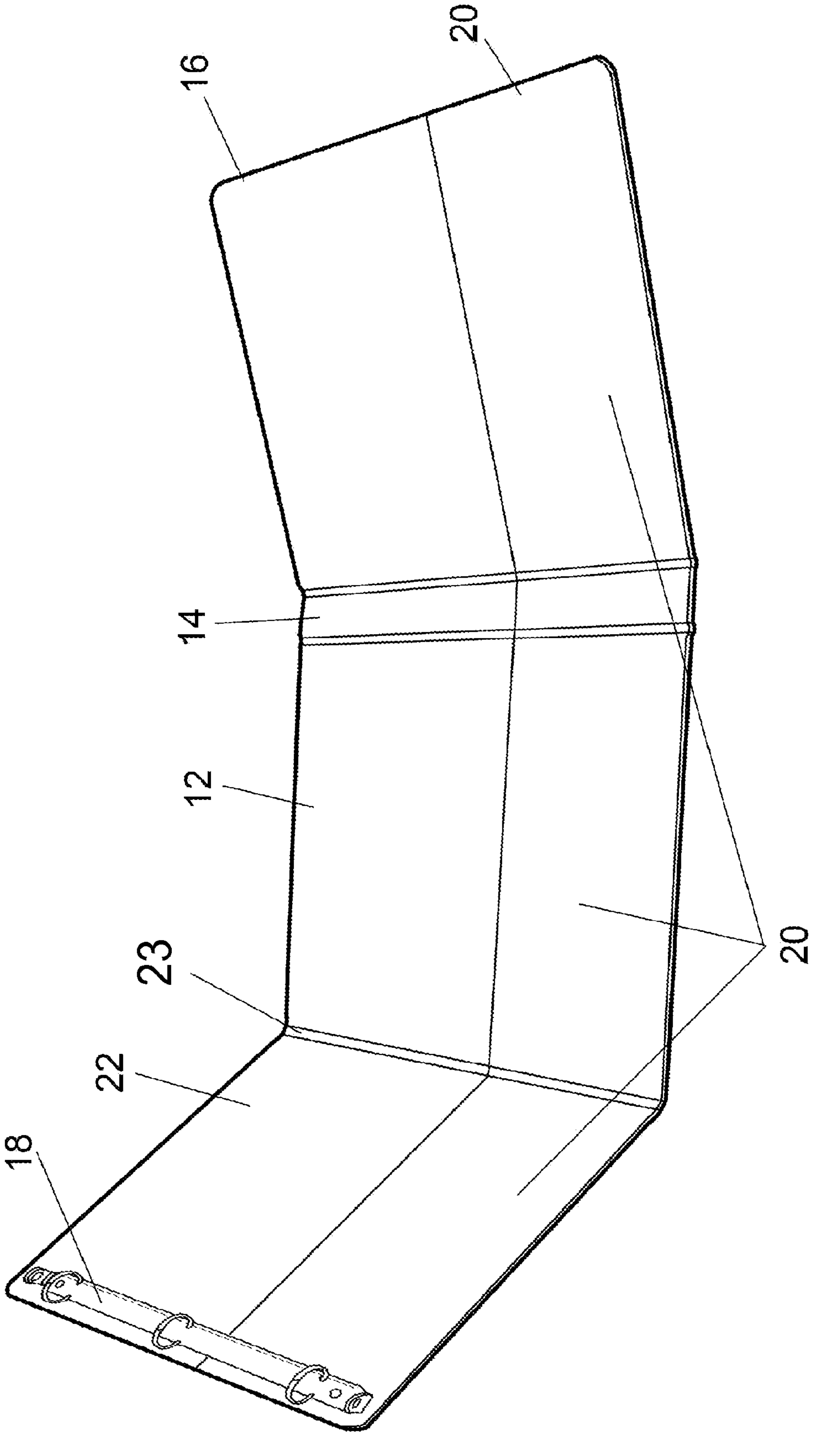
Figure 3D:
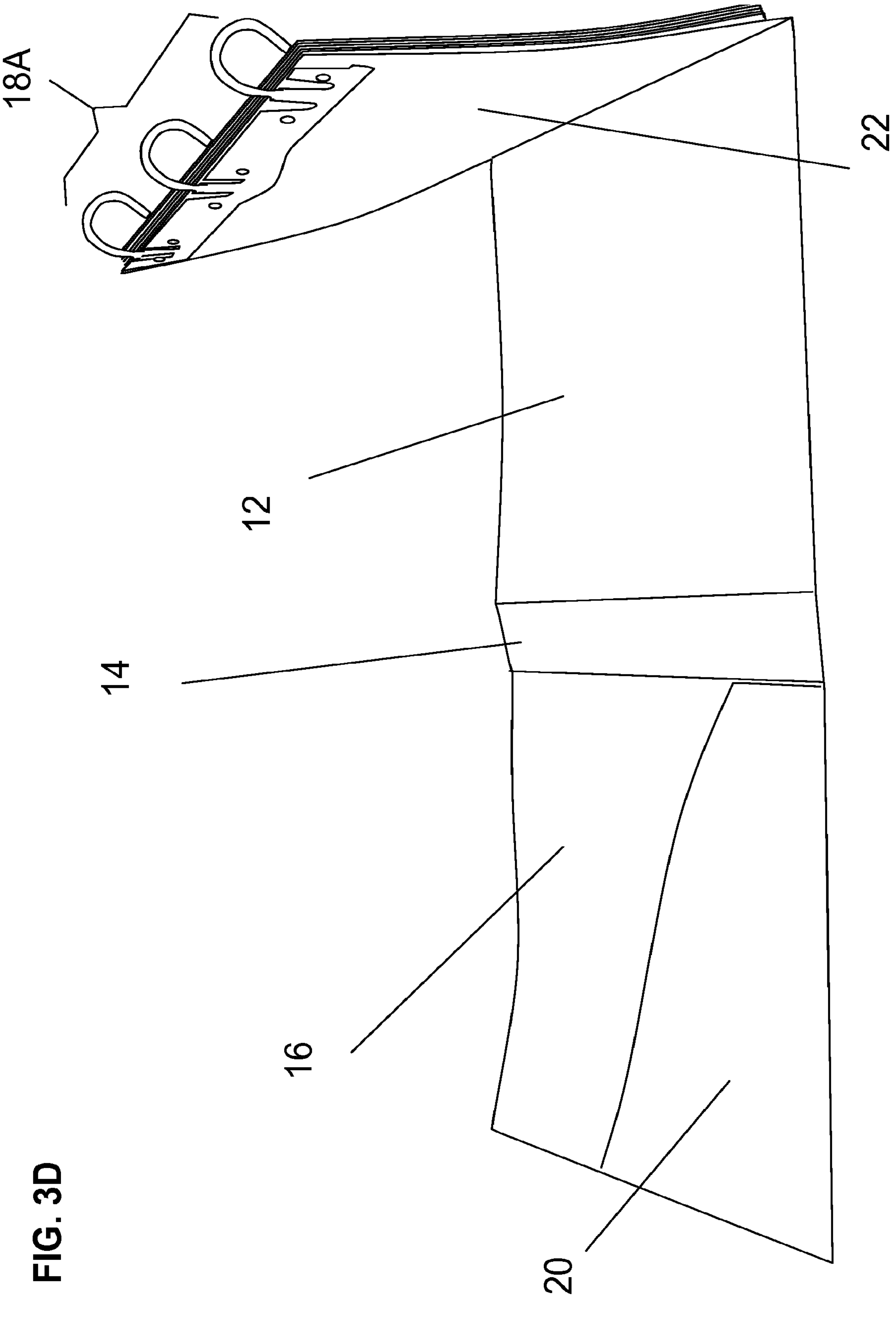
Figure 3E:
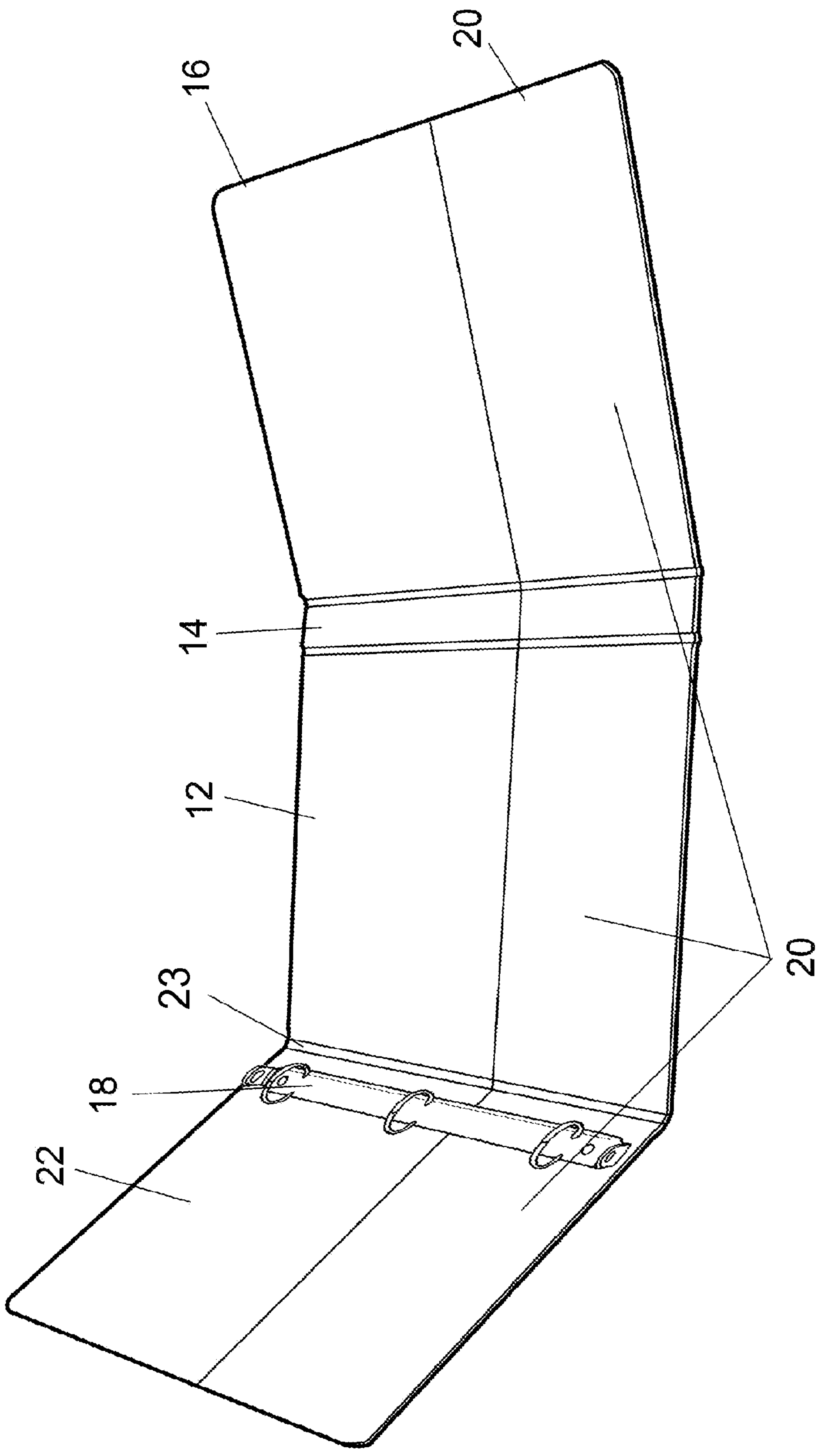
Figure 4:
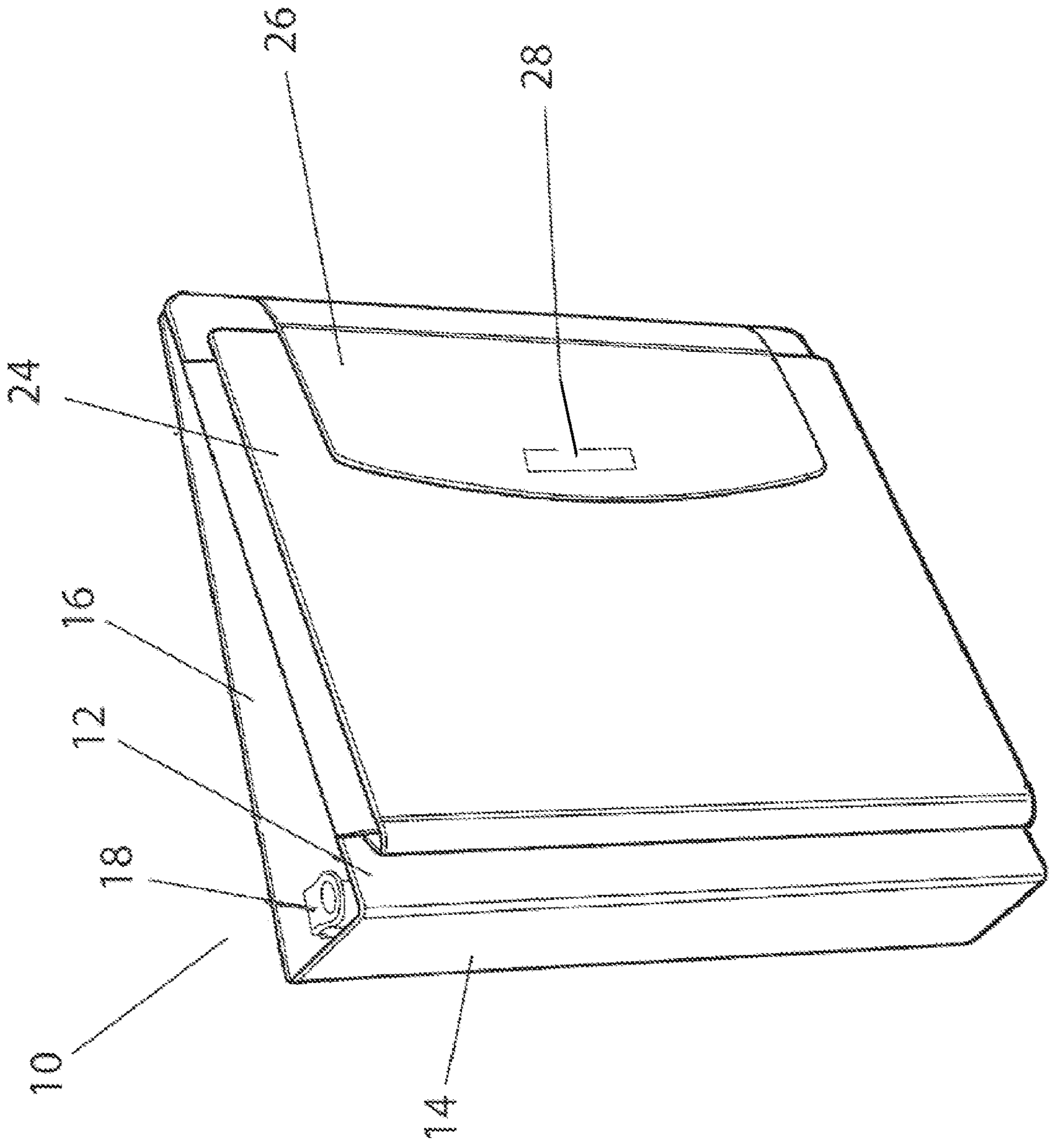
FIG. 4 shows a closed view of a bound component having an external pocket attached to the front cover.

The bound component 10 may have one or more binder extensions 22 attached to a free edge of front cover 12. The one or more binder extensions 22 may be hingedly connected. The one or more binder extensions 22 may be attached at connection point 23 to the front cover 12 by using a fold line, staples, adhesive, sewing, stitching, heat sealing, stamping or the like. The binder extension 22 could be made removable through the use of snaps, hook and loop fastener, resealable adhesive, zipper or the like. It is to be understood that the binder extension 22 may also be connected to a free edge of back cover 16. It may be beneficial for the binder extension 22 to be positioned on a cover not holding the binding mechanism 18 in order to provide more storage capacity and access to the documents without interfering with the rings. It is to be understood that to further increase storage capacity one or more pockets 20 may be provided on both sides of the binder extension 22. It is also to be understood that the binder extension may also have its own binding mechanism attached to it along the one or more free edges as in FIG. 3C (example with a conventional ring binding 18) or FIG. 3D (example with a Flex binding 18A as made by MeadWestvaco Corporation), or along the one or more bound edges as shown in FIG. 3E.

The one or more binder extensions 22 may have one or more pockets 20 as described previously. The one or more binder extension 22 may have one or more transparent pockets 20. The one or more binder extensions may have one or more non-transparent pockets 20. The one or more binder extension 22 may have a plurality of pages attached. The plurality of pages may be non-permanently bound to the one or more additional sides by using a slot to hold in a backing portion to the plurality of pages or a portion of the plurality of pages themselves. The plurality of pages may contain one or more of the following or a combination of the following: sticky notes of various sizes; lines paper; calendar pages; graph paper or any of the other types of pages. It is to be understood that the one or more binder extensions may fold inward so as to preserve the shape and size of the bound component 10 for storage purposes and/or to protect the information contained in the one or more binder extensions. It is to be understood that the one or more binder extensions 22 may be comprised of the same material as the front cover 12 and back cover 16 of the bound component 10 or a different material than the front cover 12 and back cover 16 of the bound component 10. It is to be understood that the one or more binder extensions could be transparent. The binder 10 and binder extension 22 may be made of vinyl, poly propylene, fabric, polyethylene, cardboard, paper and or a combination of any of these. It is to be understood that vinyl is the material preferred for student binders, but manufacturing preferences may prefer the use of any of the other listed materials.

The one or more binder extensions 22 may be the same size as the cover to which the binder extension is attached. The one or more binder extensions 22 may be smaller than the cover to which it is attached. The one or more binder extensions 22 may be larger than cover to which it is attached. The one or more binder extensions 22 may be over ¾ the size of the cover to which it is attached; up to ¾ the size of the cover to which it is attached; up to ½ the size of the cover to which it is attached; up to ¼ the size of the cover to which it is attached. It is to be understood that the binder 10 may close more easily if the binder extension 22 is smaller than the cover to which it is attached.

The one or more binder extensions 22 may be horizontally aligned with the spine 14 of the binder 10 (FIG. 2) or vertically aligned with the spine 14 of the binder 10 (FIG. 1).

In another embodiment, illustrated in FIGS. 4-8, the bound component 10 comprises a front cover 12, a spine 14, a rear cover 16, one or more binding mechanisms 18, and one or more external pockets 24. The front cover 12 has an inside which faces toward the binding mechanism and an outside which faces away from the binding mechanism. The rear cover 16 has an inside which faces toward the binding mechanism and an outside which faces away from the binding mechanism. The one or more external pockets 24 may be located on the outside of front cover 12 or back cover 16. There may be a benefit to include the one or more external pockets 24 on the outside of the front cover 12 to allow the back cover 16 to lay flat when placed on a desk or table or other such surface.

The one or more external pockets 24 may have one or more closure flaps 26. The one or more closure flaps may be attached to the front cover 12 or rear cover 16 by a fold line, adhesive, stitching, sewing, staples, heat sealed or the like. The one or more closure flaps 26 may also be hingedly attached to the pocket 24 by fold line, adhesive, stitching, sewing, staples, heat sealing or the like. The closure flaps 26 may be removably attached to the pocket at attachment point 28 using hook and loop fastener, magnets, reattachable adhesive, bungee cord, tie, clasp, button, clip, hook, ring, snap or other such means. Attachment point 28 may have various shapes, including but not limited to rectangles, squares, ovals, circles, polygons, and combinations thereof. It is to be understood a zipper closure means could be used in lieu of closure flap 26 or to close the closure flap 26. It is also to be understood that the removable attachment point may be adjusted based on manufacturing preferences.

The external pocket may be oriented such that the opening 36 is facing the spine 14, is parallel to the spine 14 but facing the free edge (FIG. 5), is perpendicular to the spine 14 and located at the top of the binder 10 (FIG. 7), or is perpendicular to the spine 14 and located at the bottom of the binder 10. The top of the binder 10 orientation for the opening 36 may be beneficial to prevent materials from sliding out of the pocket 24. The opening 36 oriented toward the free edge and parallel to the spine 14 may be beneficial to prevent materials from falling out of the external pocket 24 due to the fact that the binder is typically held by the user such that their hand clasps this end.

The external pocket 24 may be affixed to the outside of the front cover 12 or rear cover 16. The closing flap 26 may be affixed to one or more outside edges of the front cover 12 or rear cover 16. The pocket 24 may be affixed around one or more outer edges of the cover, such that one or more pocket openings 36 are formed between the outside of the front cover 12 or rear cover 16 and the inside of pocket 24. Affixing the pocket 24 and the flap 26 using a heat sealing method may have manufacturing benefits such as reduced production cost and increased production speed. The pocket 24 may be separated into compartments or multiple pockets 24 and/or multiple flaps 26 may be affixed on the front cover 12 or rear cover 16. It is to be understood that manufacturing preferences may determine whether the pocket 24 and/or flap 26 arc affixed to the outside edge of the front cover 12 or rear cover 16, inside the edges of the front cover 12 or rear cover 16, or anywhere else on the outer surface of the front cover 12 or rear cover 16.

The external pocket 24 may be removably attached. In such an instance the external pocket would have one or more interior wall that would removably attach to the outside of the front cover 12 or rear cover 16. Removable attachments may include hook and loop fastener, resealable adhesive, snaps, buttons, hooks magnets, bungee cords or the like. Manufacturing preferences may prefer that the closure flap 26 be affixed to the pocket 24 rather than outside of the front cover 12 or rear cover 16.

Figure 5:
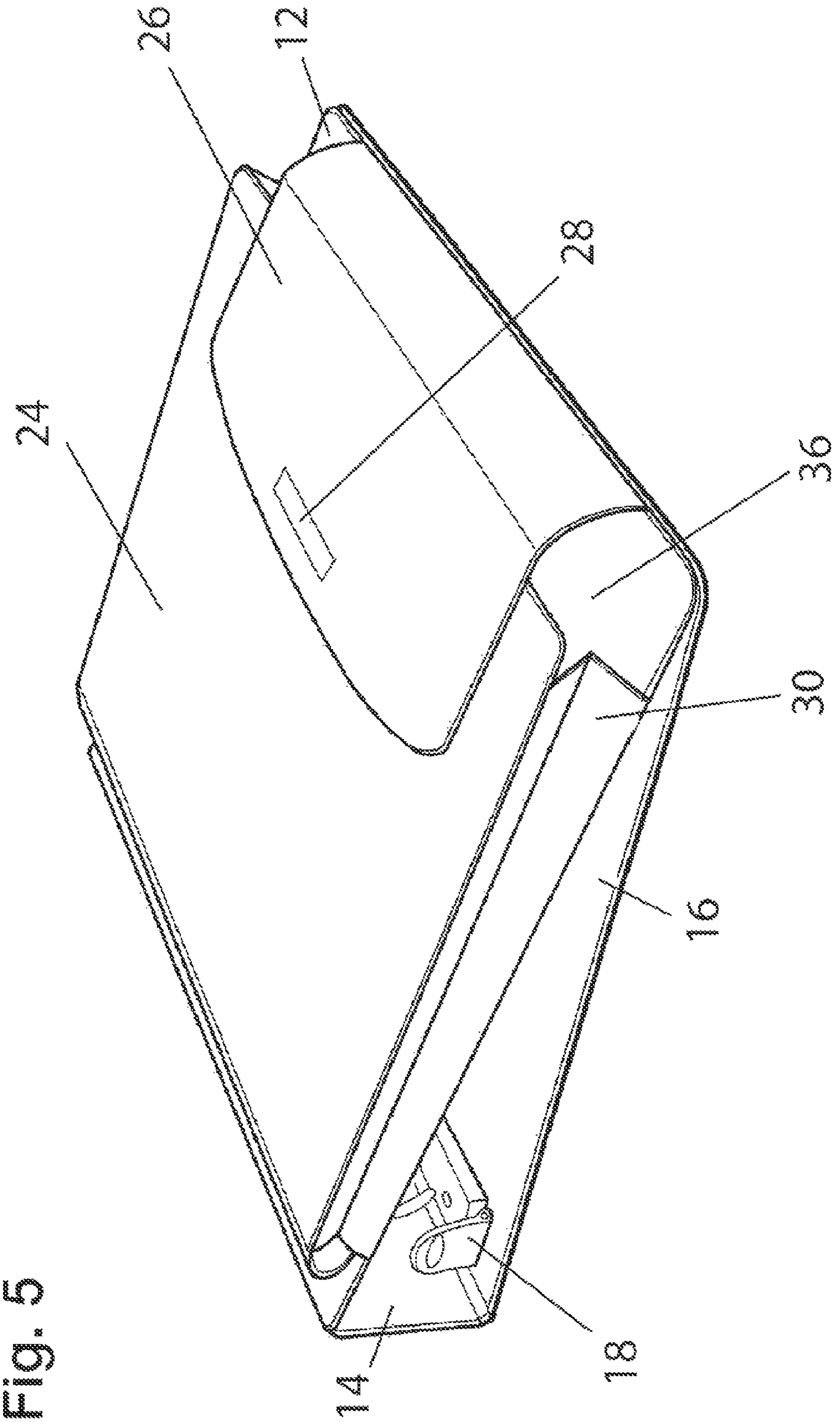
FIG. 5 shows a different view of the bound component in FIG. 4.
Figure 6:
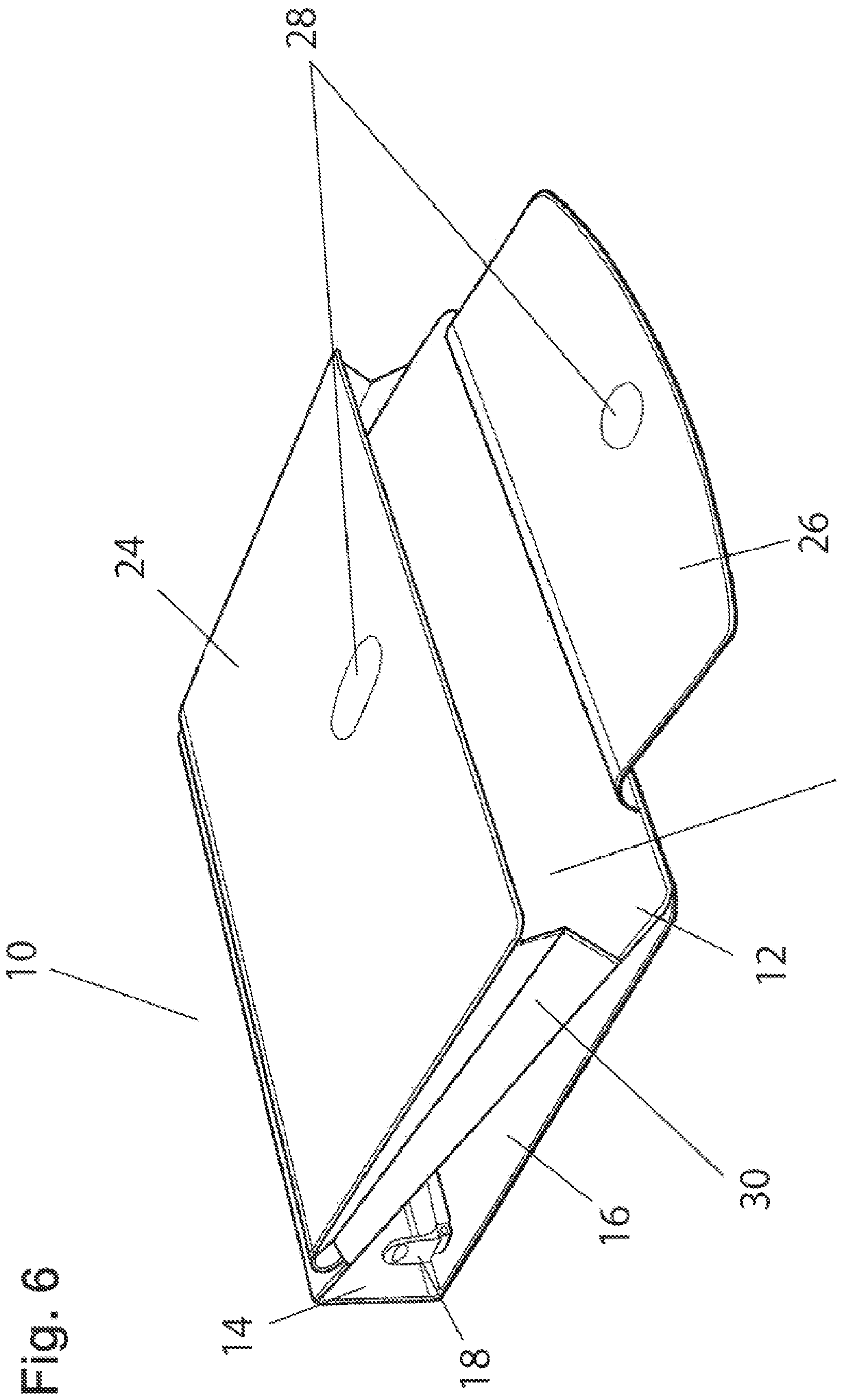
FIG. 6 shows a view of the bound component of FIG. 4 with the external pocket in an open configuration.
Figure 7:
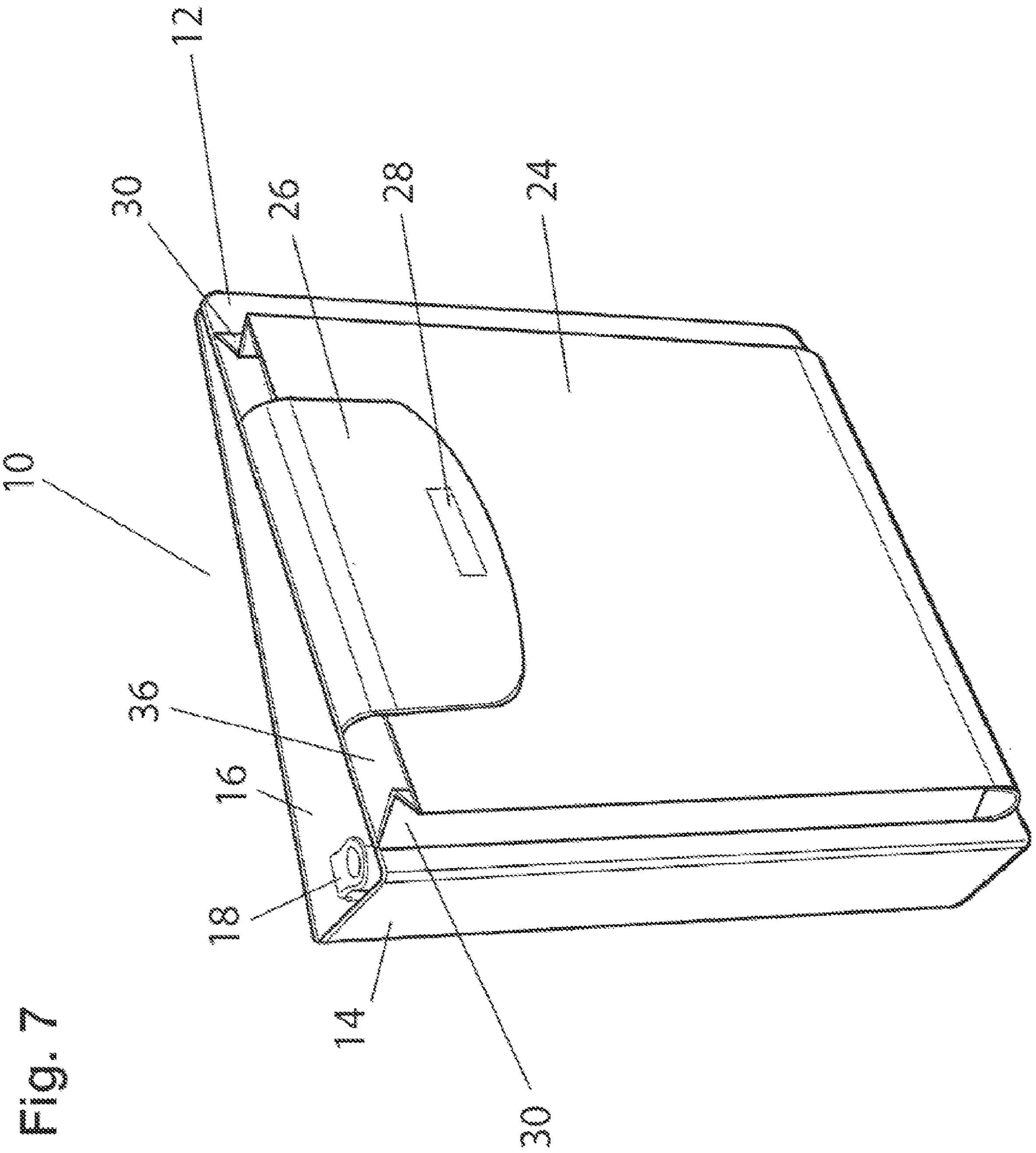
FIG. 7 shows a closed view of a bound component having an external pocket attached to the front cover.
Figure 8A:
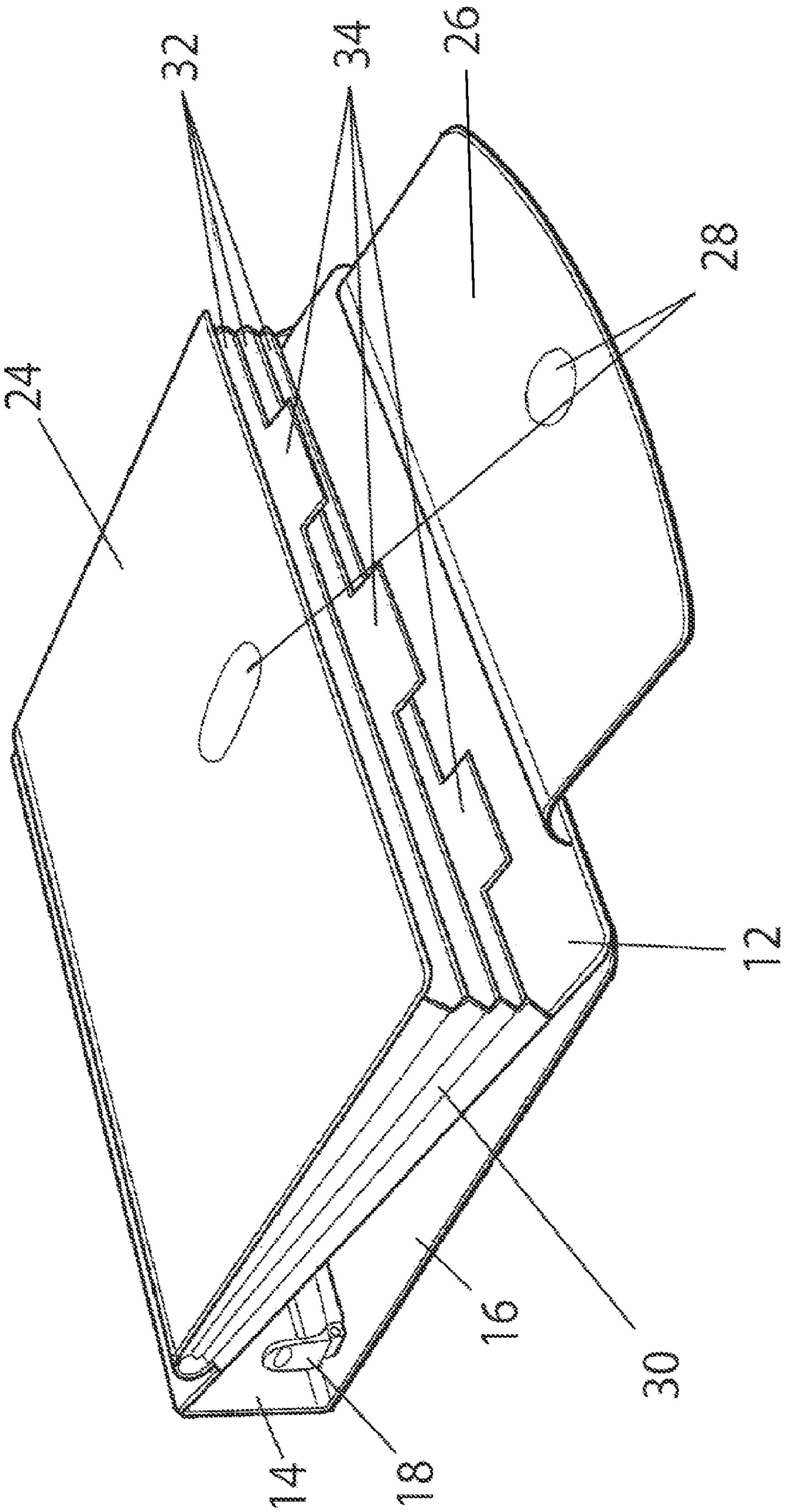
FIG. 8A shows a closed view of a bound component having an external pocket attached to the front cover where the external pocket is an expandable file folder pocket.
Figure 8B:
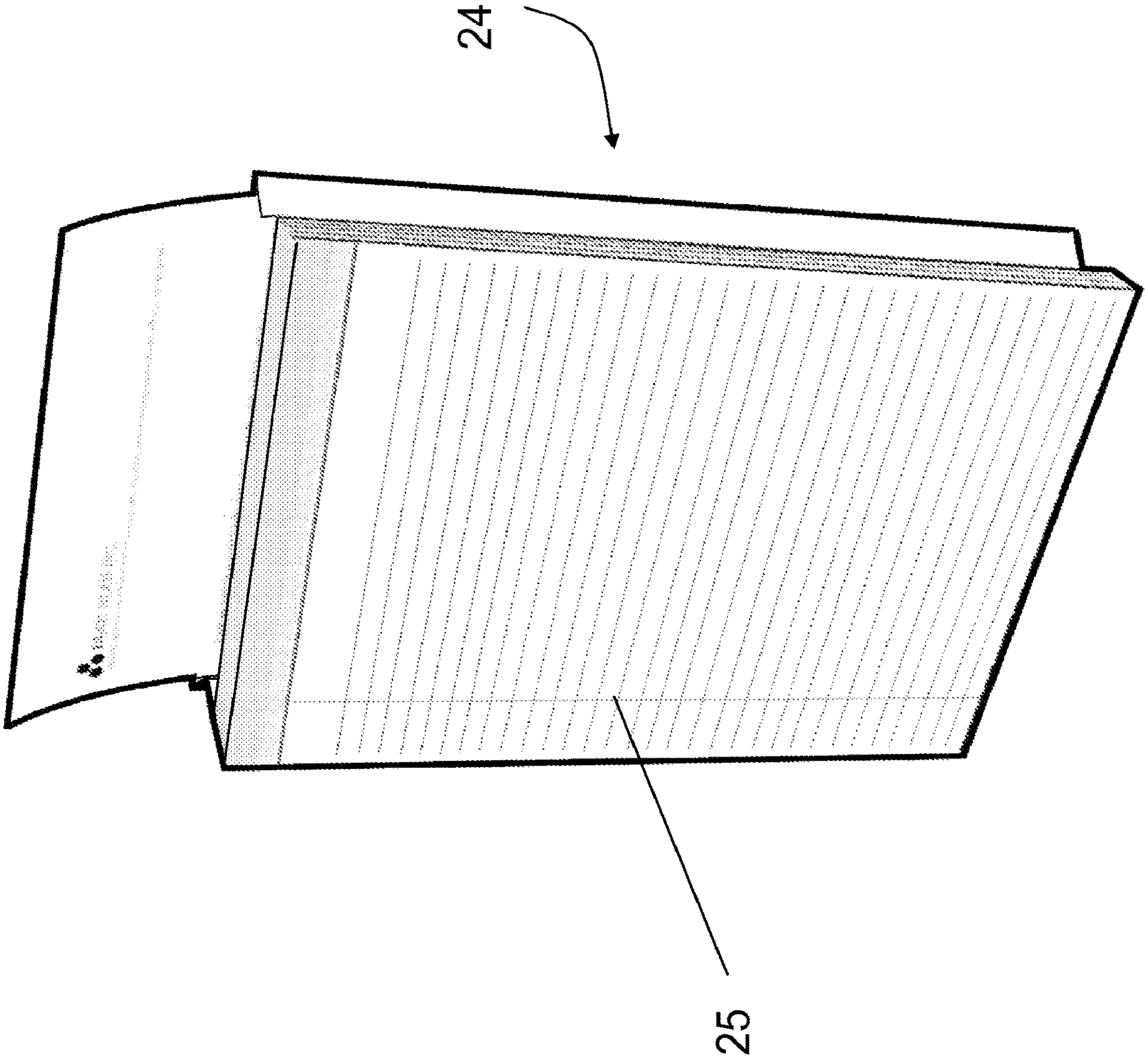
FIG. 8B shows a view of a notebook having an attached external pocket.

The one or more external pockets 24 may be expandable as shown in FIG. 5 and in FIGS. 8A and 8B. As illustrated in FIG. 8A external pocket 24 may have one or more dividers 32 inside the pocket. The one or more dividers 32 may have identifier tabs 34 to allow the user to organize the information contained therein. The sides of the one or more pockets may have one or more side gussets 30 and/or one or more bottom gussets 30. The gussets 30 may be creased and folded inward towards the interior of the pocket or extended outward from the interior of the pocket.

The pocket opening 36 may be formed between the external side of the cover to which it is attached and the internal side of the pocket attachment 24. A variety of materials could be used to create the binder 10 and external pocket 24, including fabric, plastic and/or vinyl.

External pocket 24 may be the same length and width as the cover to which it is attached. External pocket 24 may be over ¾ the size of the cover to which it is attached. External pocket 24 may be over ½ the size of the cover to which it is attached. External pocket 24 may be over ¼ the size of the cover to which it is attached.

It is to be understood that a bound component as covered in this application may include one or more binder extensions 22 and one or more external pockets 24.

It is to be understood that the pockets 20 and/or external pocket 24 with closure flap 26 may be formed from a plastic substrate, and/or a paper substrate and may be transparent or opaque based on manufacturing preferences. The materials may be treated or coated based on manufacturing preferences. The bound component 10 may be a traditionally sized and shaped binder. The bound component 10 may be made of a plastic substrate or a paper substrate, or either type of substrate treated and/or coated based on manufacturing preferences. The identifier tabs 34 may be integral to the one or more dividers 32 or they could be sealed, adhered, attached thereto. The one or more identifier tabs 34 may be permanently deployed or optionally deployable as disclosed in U.S. Application Nos. 61/038868; 61/086550; Ser. No. 12/264630; 12/392183; 12/420444. The one or more identifier tabs 34 and or the front cover 12 and or the back cover 16 may be made of a non-porous material and may be able to be marked upon as disclosed in U.S. application Ser. Nos. 10/828073 and 10/962724. The one or more tabs 34 may have a one or more hole(s) to allow attachment to another binder.

It is to be understood that a binder 10, according to this application, may have both a binder extension 22 and an external pocket 24 with a closure flap 26.

It is also to be understood that a removable pocket 24 may be designed for other such office and school products including but not limited to a notepad 25 (as shown in FIG. 8B) and/or a spiral binder. In such a design, a slot may be placed on the pocket to attach the pad or spiral binder to the pocket. Manufacturing preferences will indicate if a removable adhesive, hook and loop fastener, or a slot and insert combination or other such attachment means as suggested throughout this application would function as desired. In addition, such a pocket may be permanently adhered or connected to a notepad or spiral binder.

Figure 9:
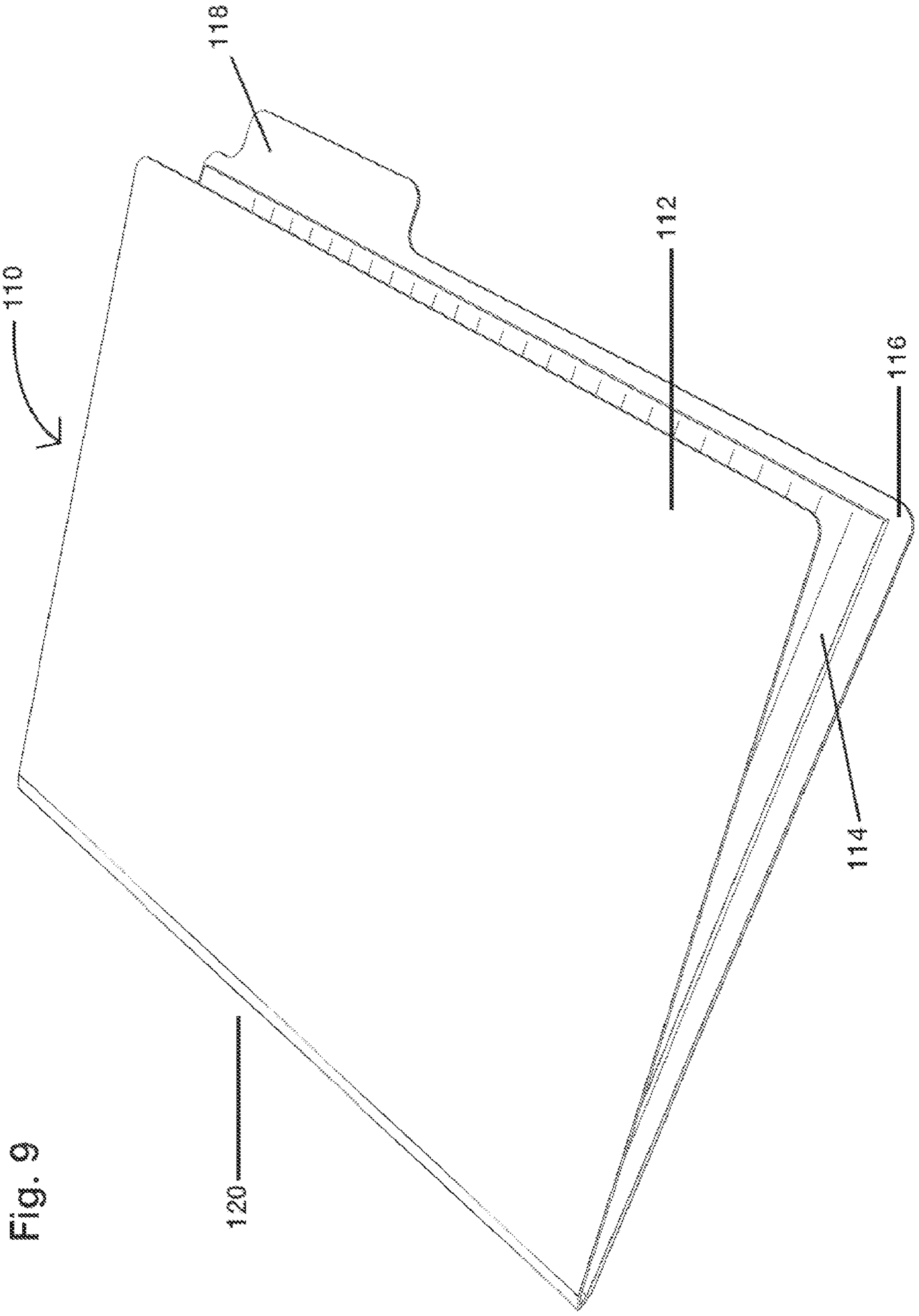
FIG. 9 shows a bound component having a plurality of pages bound to a folder having a tab extending from an unbound edge where the bound component is in a closed configuration.

As shown in FIGS. 9-23, in another embodiment a bound component generally designated 110 may include a front cover 112, a plurality of pages 114, and a rear cover 116, with the front cover 112 and rear cover 116 pivotally coupled to spine 120. Referring to FIG. 9, a bound component 110 is shown, including a front cover 112, a back cover 116 and a spine 120. The back cover 116 may have one or more tabs 118 on one or more free edges or non-bound edges. The bound component 110 may have a plurality of pages 114 bound to the spine 120.

Figure 10:
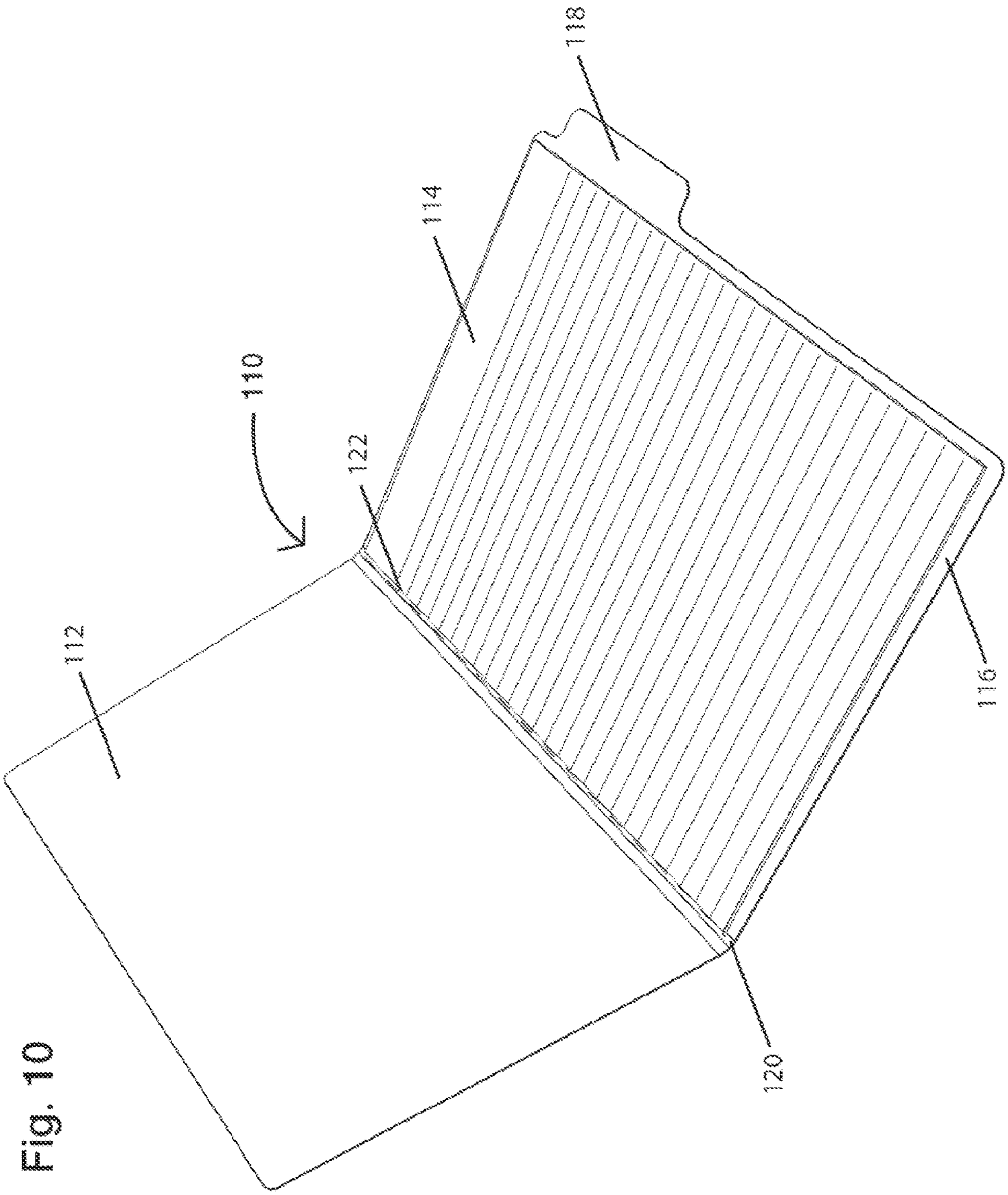
FIG. 10 shows the bound component of FIG. 9 in an open configuration.

FIG. 10 shows a bound component 110 in an open orientation. The binding mechanism 122 may align with spine 120. The binding mechanism 122 may be adhesive, staples, string (sewn) or any other similar material as determined appropriate by manufacturing preferences. It is to be understood that the plurality of pages 114 may be bound to the inside of the front cover 112 or the back cover 116 using an attachment or binding mechanism 122 including adhesive, string and/or staples. It is to be further understood that the plurality of pages 114 may be bound to the front cover 112 and/or rear cover 116 along the edge attached to the spine 120 or along a free edge.

Figure 11:
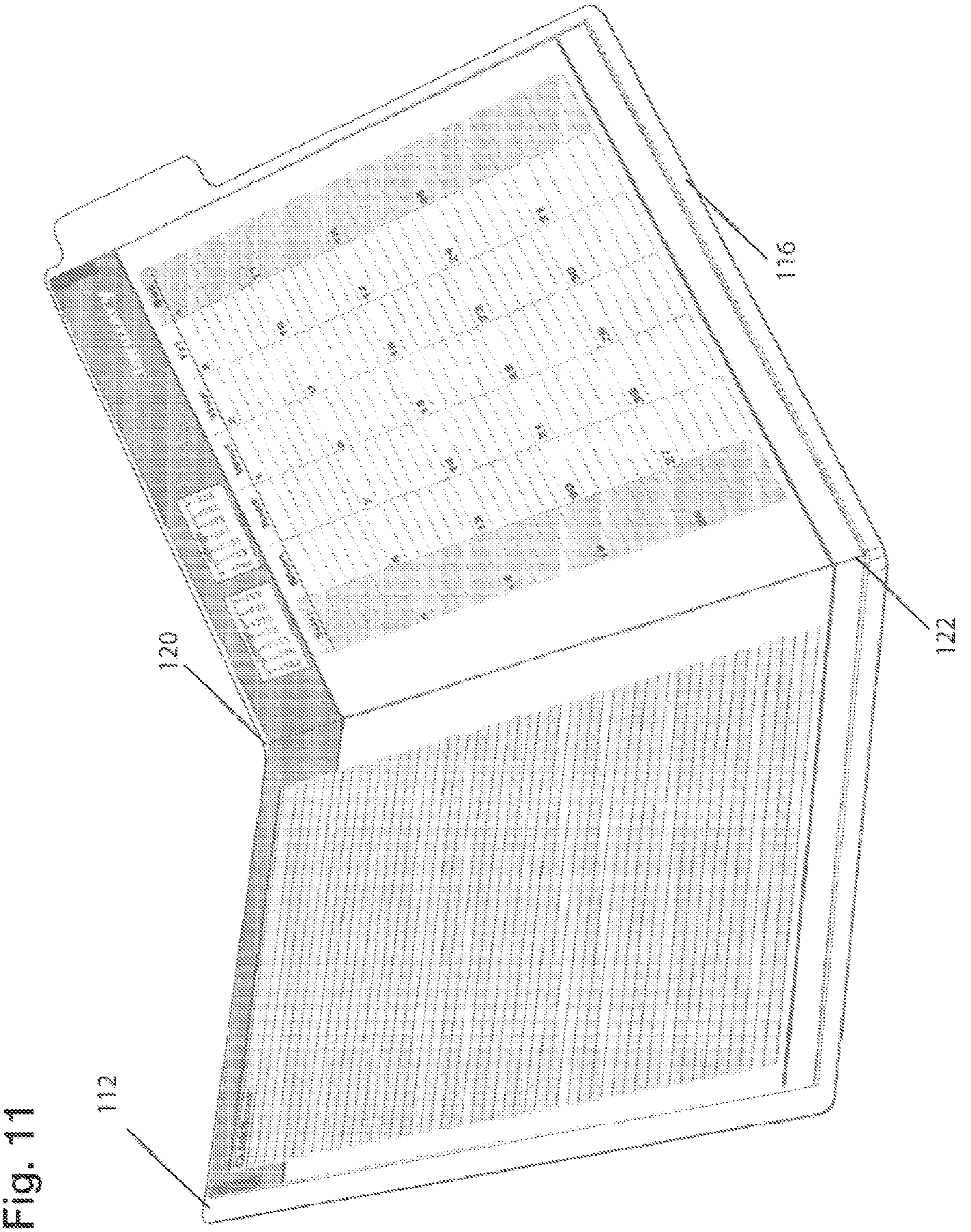
FIG. 11 shows a modified version of the bound component of FIG. 9 using different page formats, including calendar and notes pages instead of lined pages in the plurality of pages.

FIG. 11 illustrates a bound component 110 similar to those of FIGS. 9 and 10. The plurality of pages 114 may be bound to the spine 120 using staples or another binding mechanism 122. The binding mechanism 122 may attach the middle of the plurality of pages 114 to spine 120. It is to be understood that this attachment could occur at any of the following location within the plurality of pages: at the front of the plurality of pages, with the first third of the plurality of pages, the front half of the plurality of pages, the center of the plurality of pages, the second third of the plurality of pages, and/or the back of the plurality of pages.

Figure 12:
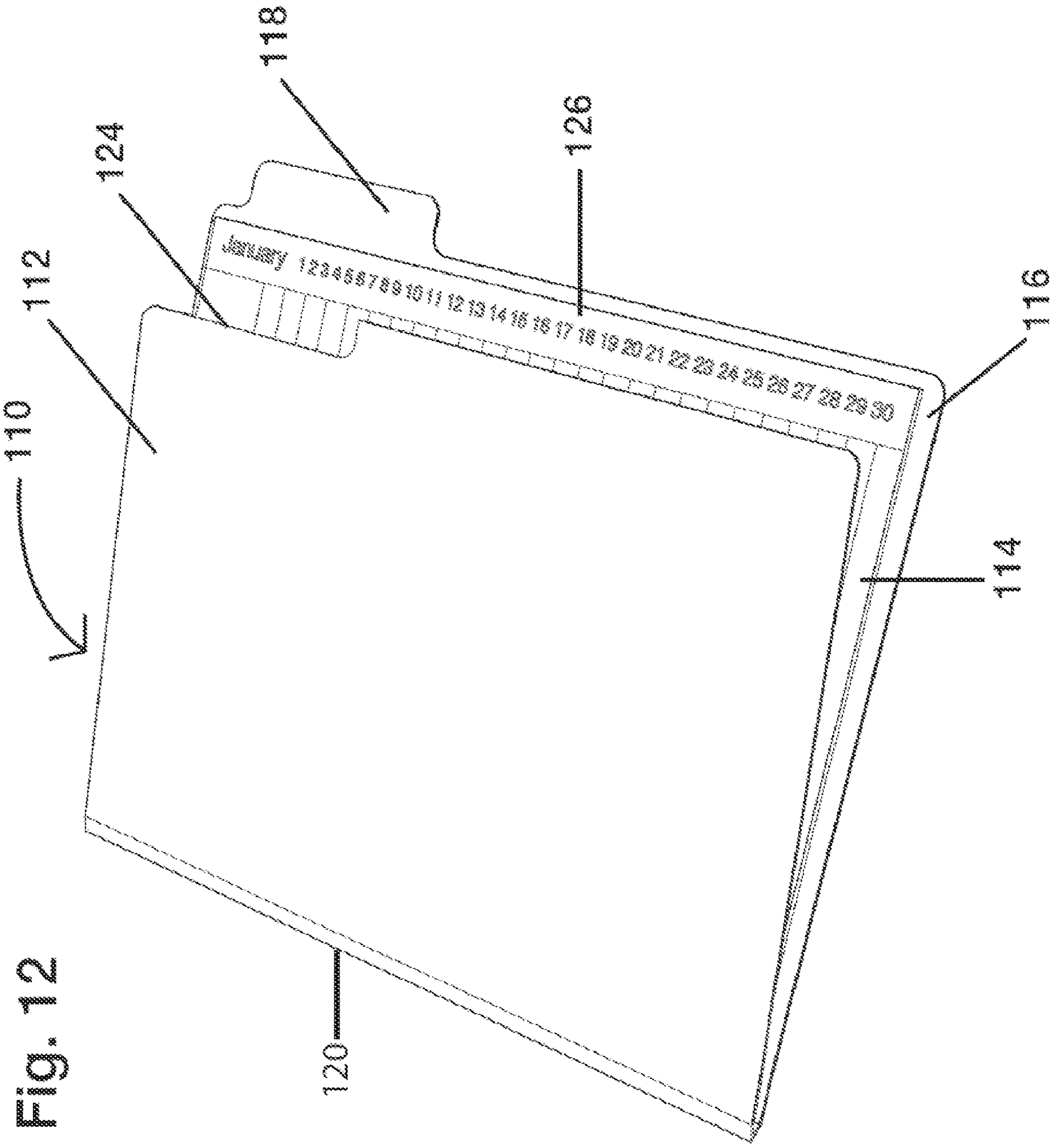
FIG. 12 shows a bound component having a cut out in one portion of the front cover to better show the contents of the plurality of pages and having a section on the right margin of the at least one plurality of pages containing identifying information, in this case date information.

FIG. 12 shows a bound component 110 with a front cover 112, back cover 116 and a spine 120. Back cover 116 may have one or more tabs 118 that may be used to contain identifying information. Front cover 112 may have an indention 124 to allow partial viewing of the plurality of pages 114 bound to spine 120 inside bound component 110. One or more pages within the plurality of pages may have a column 126 that may align with indention 124 and may allow an additional area for the user to record identifying information. It is to be understood that additional identifying information or summary information could be recorded in a printed box on inside or outside of front cover 112 or rear cover 116. It is to be further understood that the front cover 112 and/or rear cover 116 may be attached together or may be formed of one piece of material. It is to be understood that the front cover 112 may be one type of material while the rear cover may be a different type of material.

Figure 13:
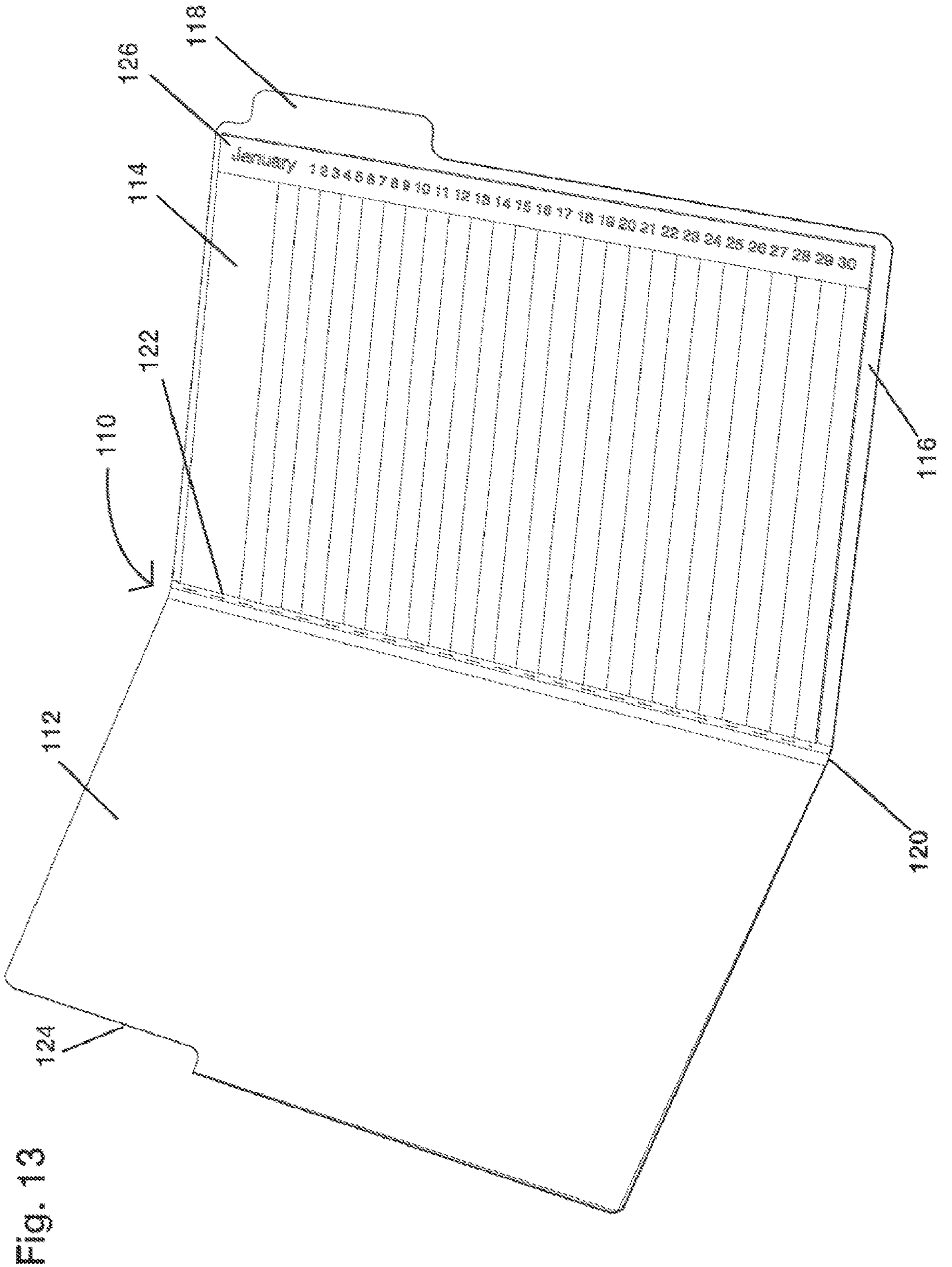
FIG. 13 shows an open configuration for the bound component of FIG. 12.

FIG. 13 shows the bound component 110 of FIG. 12. Column 126 may have pre-printed identifying information such as the date, subject matter, or other information. The date may be pre-printed in column 126 or a space may be indicated to record the date. Column 126 may also include a section for the user to record a task list, to do list, assignments, homework, client or customer information, case number/matter information or the like. Column 126 may also just be a generic section blank or with lines drawn in for the user to add whatever information they desire to identify the contents of the folder. Column 126 may be shaded, a different color, a different texture, and/or have information to be recorded aligned parallel or perpendicular to the information to be recorded in the main portion of the plurality of pages.

Figure 14:
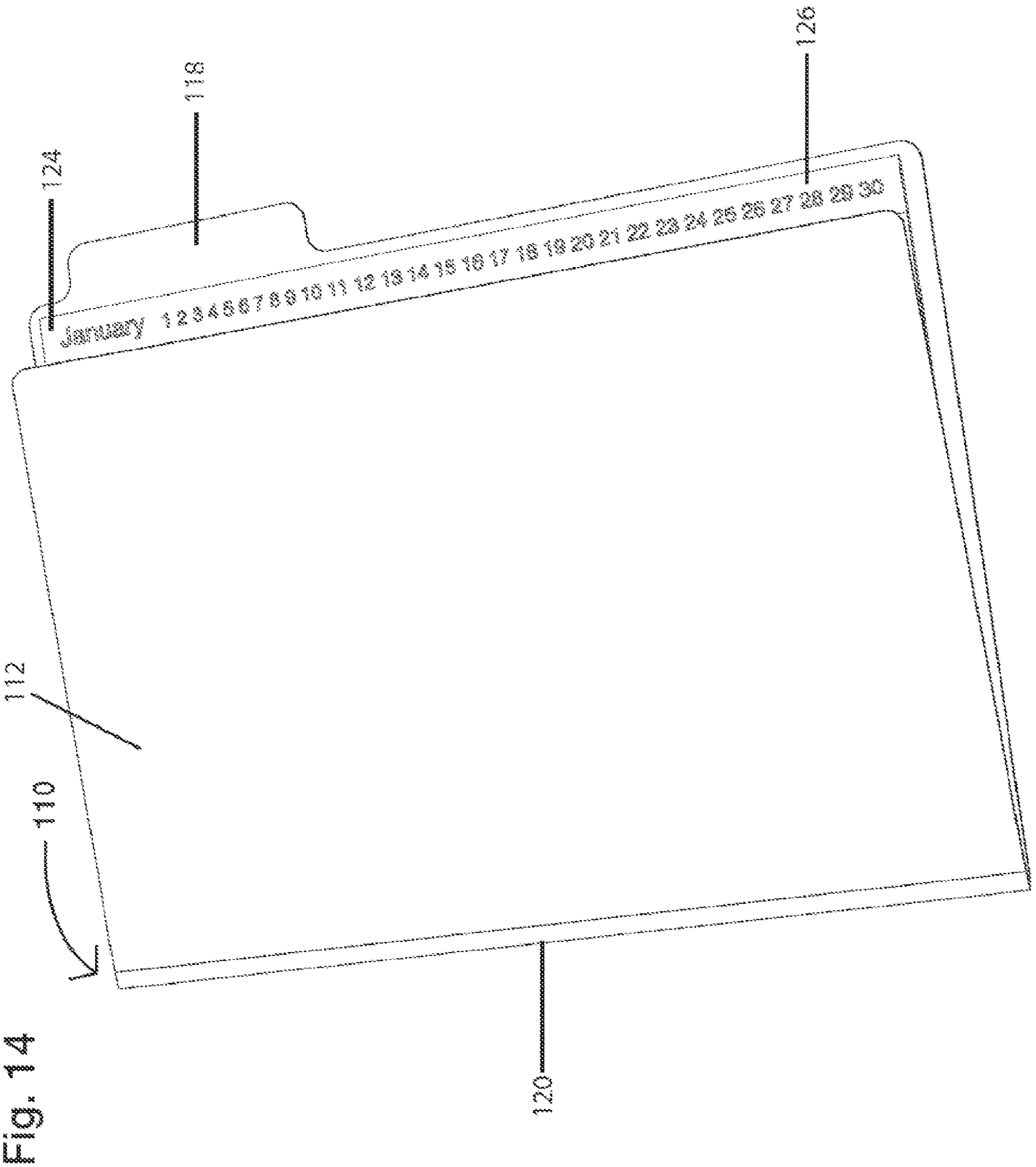
FIG. 14 shows a closed configuration for a bound component having a shortened front cover such that the right margin of the plurality of pages is visible.

FIG. 14 illustrates a bound component 110 with a front cover 112, a back cover 116, a spine 120 and a plurality of pages 114 bound to spine 120. Back cover 116 may have one or more tabs 118. Front cover 112 may have a width less than back cover 116. Front cover 112 may be formed such that column 126 may be viewed when the folder is in a closed position. The majority or all of column 126 may be viewable. Manufacturing preferences will determine if the entire column 126, up to ½, up to ¼, or up to ¾ of the column 126 may be viewable when the bound component is in the closed position. Manufacturing preferences will determine if front cover 112 indention 124 extends the full length of the front cover 112, up to ½, up to ¼, or up to ¾ of the cover 112. It is to be understood that the front cover 112 may have a section of clear material that extends over this indention portion or may extend over the entire front cover 112 such that the contents on the front page would be visible while the bound component was in the closed position.

Figure 15:
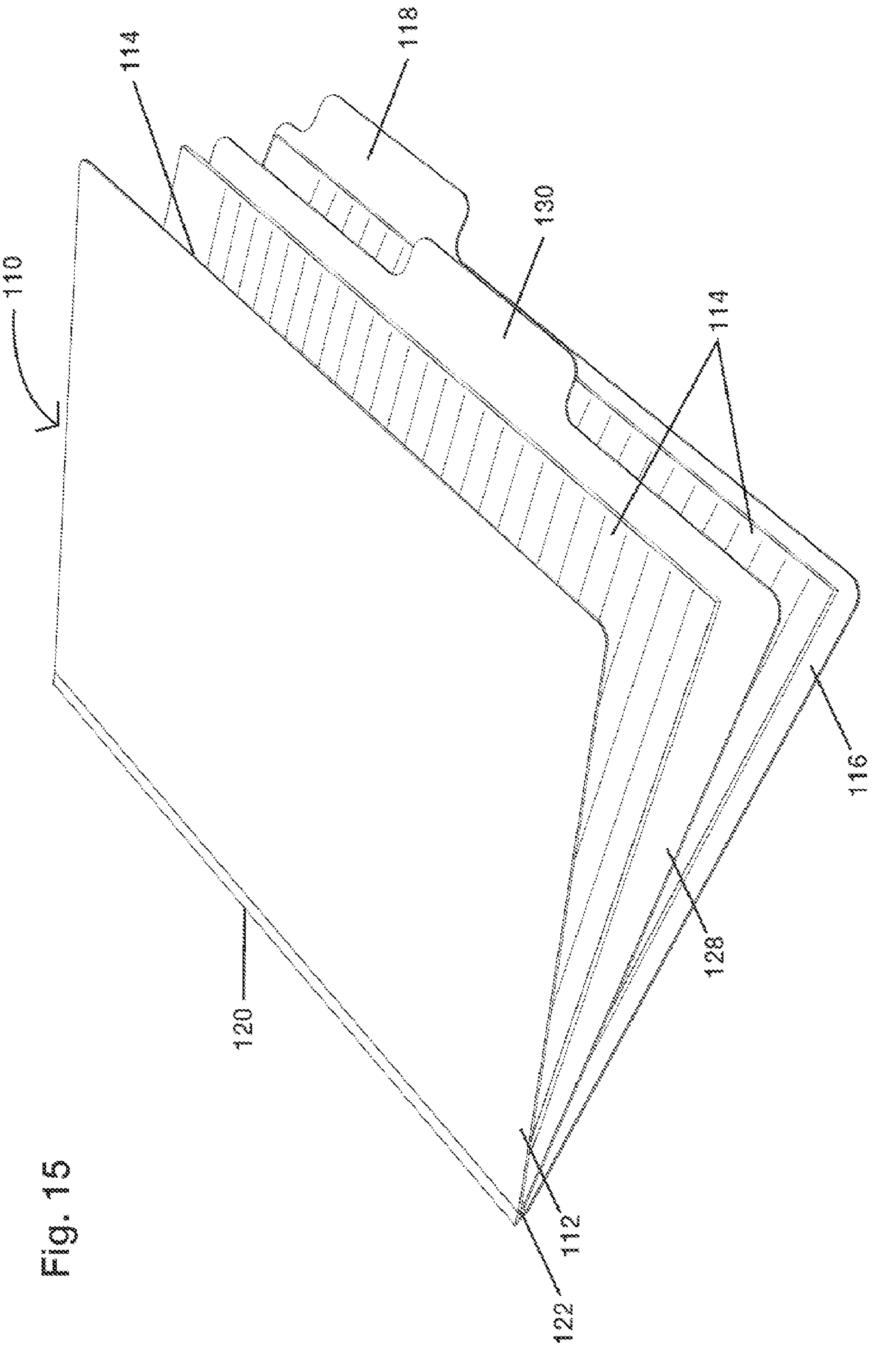
FIG. 15 shows a bound component having an additional divider bound between the plurality of pages.
Figure 16:
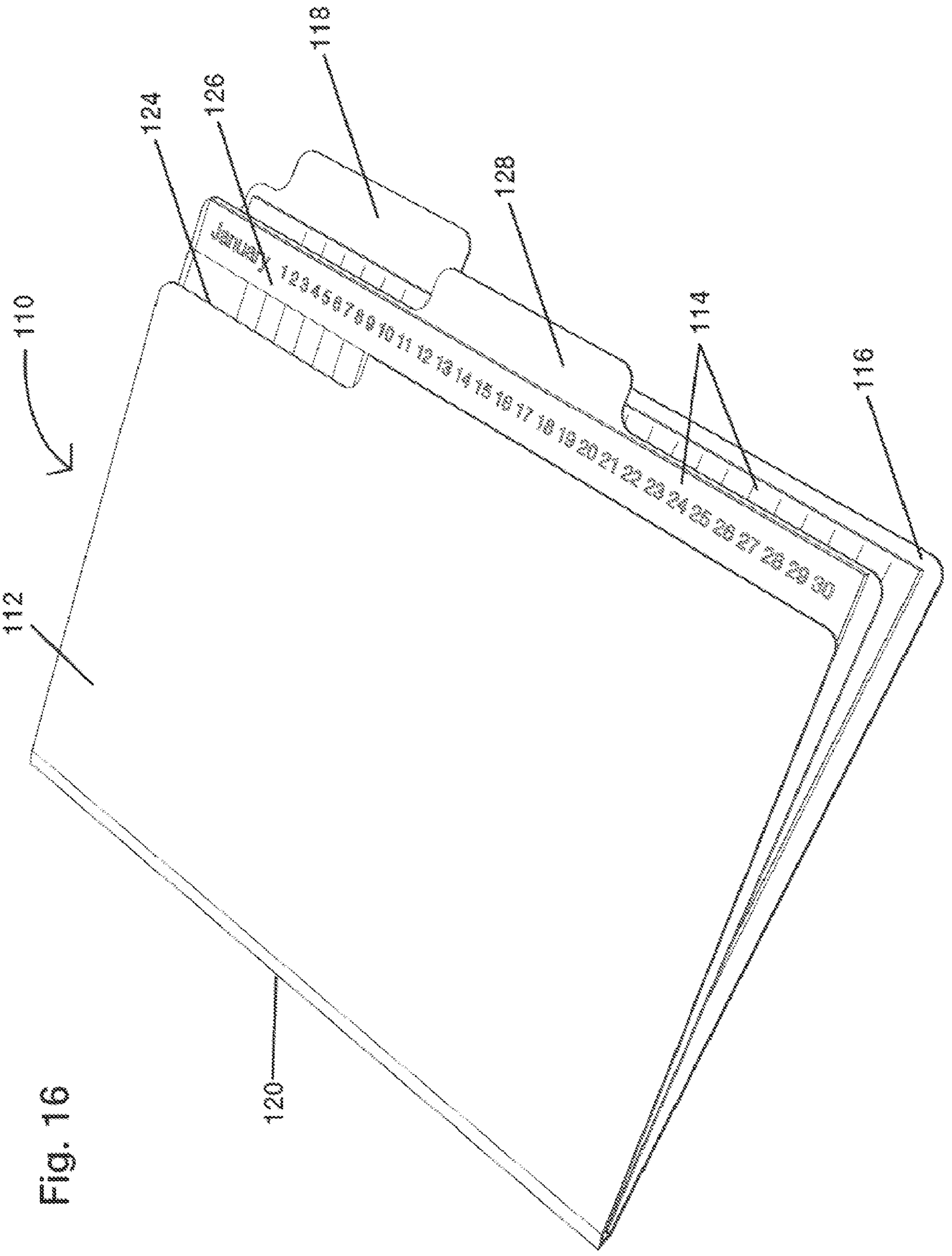
FIG. 16 shows a bound component having an additional divider bound between the plurality of pages and showing the plurality of pages having a right margin designed to contain identifying information of some sort.
Figure 17:
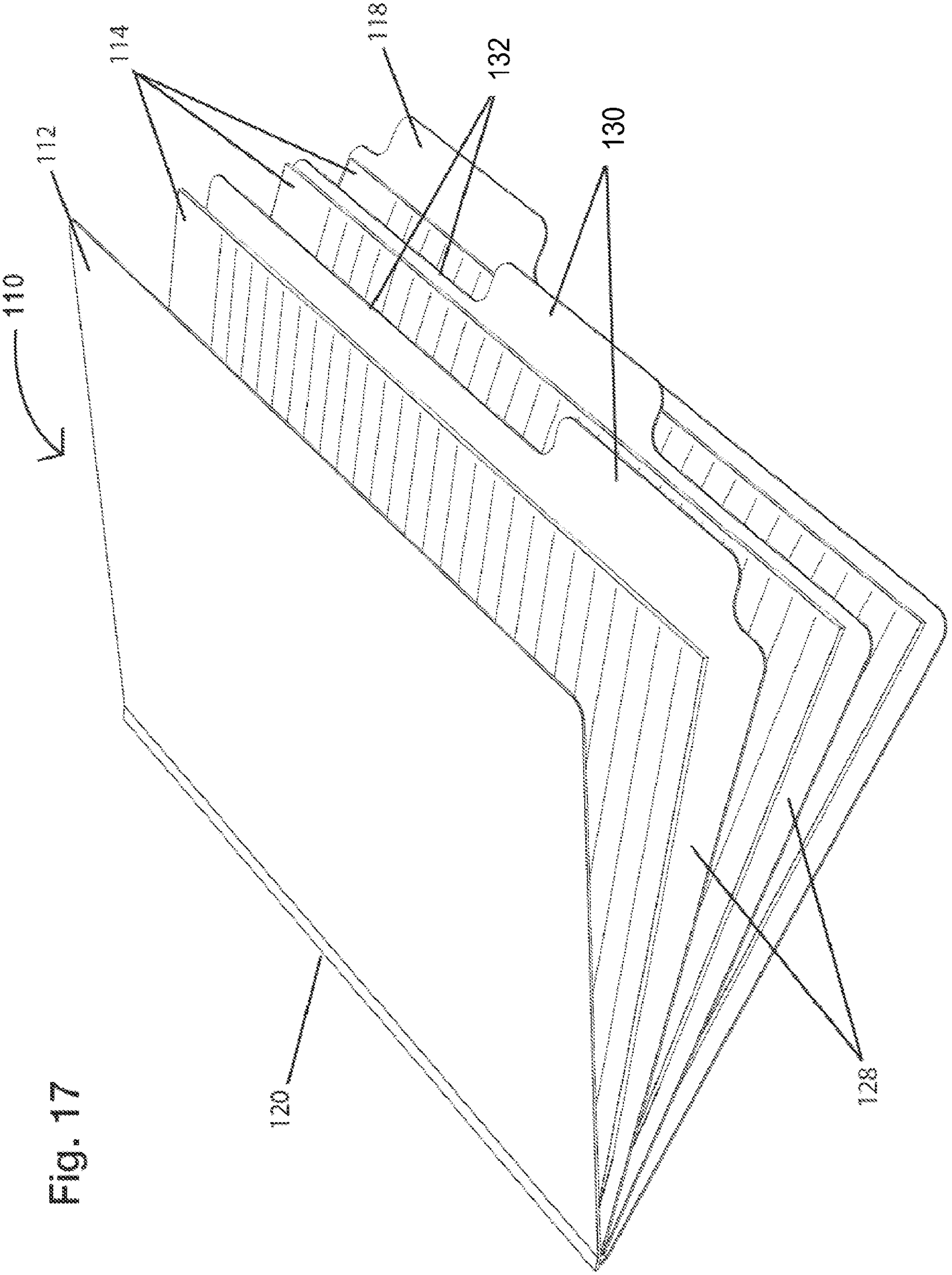
FIG. 17 shows a bound component having a plurality of dividers bound between the plurality of pages.
Figure 18:
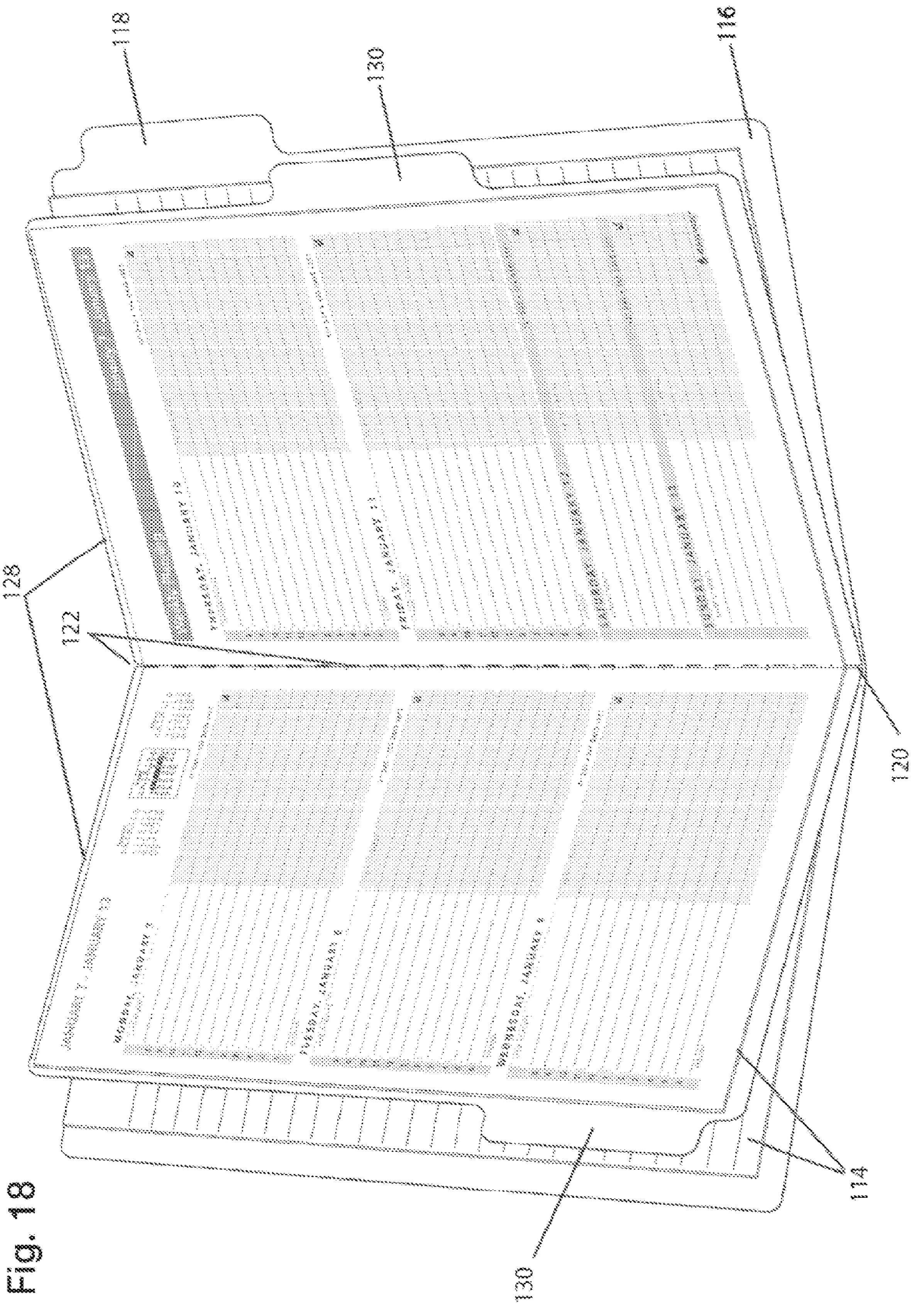
FIG. 18 shows a bound component having an open configuration having a plurality of pages and a plurality of dividers between the pages.

FIGS. 15-17 illustrate a bound component with front cover 112, back cover 116, and spine 120. A plurality of pages 114 may be bound to spine 120. One or more inner dividers 128 may be bound to spine 120. The one or more inner dividers may have one or more tabs 130. It is to be understood that such tabs 130 may be integrally formed from the one or more inner dividers 128, may be optionally deployable and or may be a separate material attached to the one or more inner dividers. The one or more tabs 130 may have preprinted indicia such as days of the week, or data for the user to fill in such as class name, date, project title, client name, or other such information. Front cover 112 may have one or more indentions 124 that extend all or part of the length of the cover or column (as explained elsewhere in this application). Inner divider 128 may have indentions 132. Manufacturing preferences will determine if the inner dividers are individually connected or if they are connected at a central seam as shown in FIG. 18.

Figure 19:
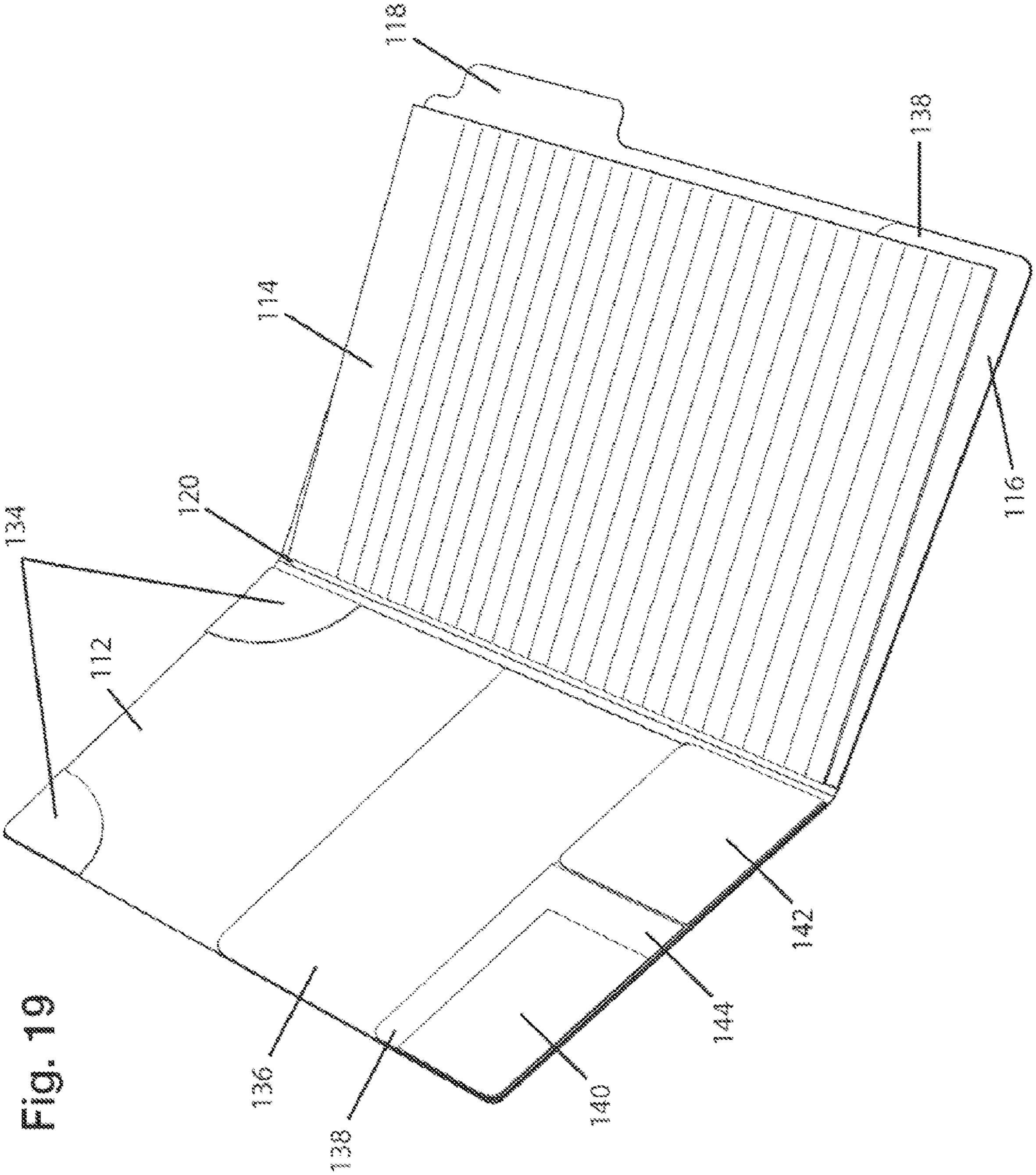
FIG. 19 shows a bound component having an open configuration with pockets on one or more covers of the bound component.
Figure 20:
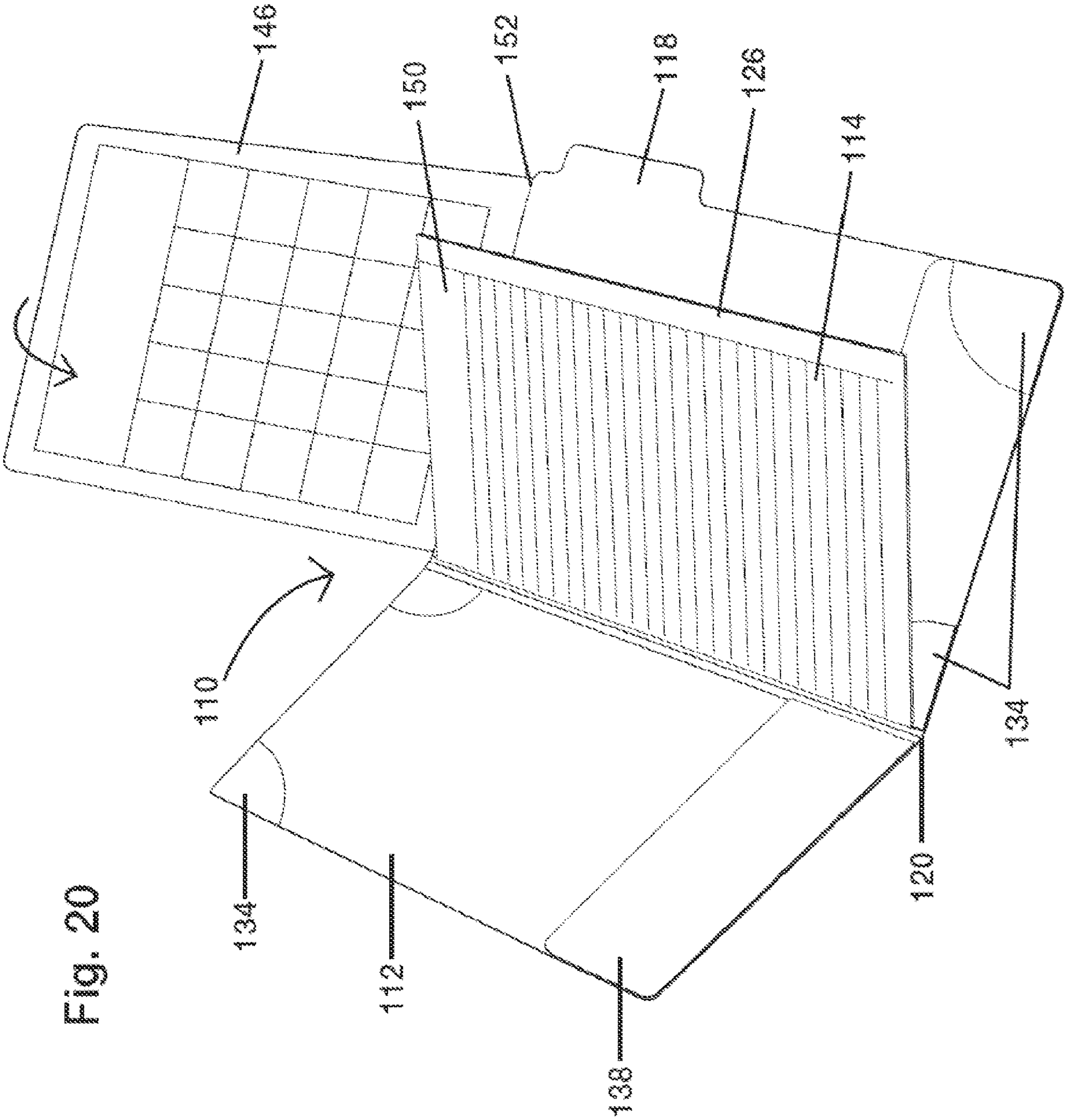
FIG. 20 shows a bound component having pockets, a plurality of pages, identifier tab, and an additional portion containing another set of a plurality of pages.
Figure 21:
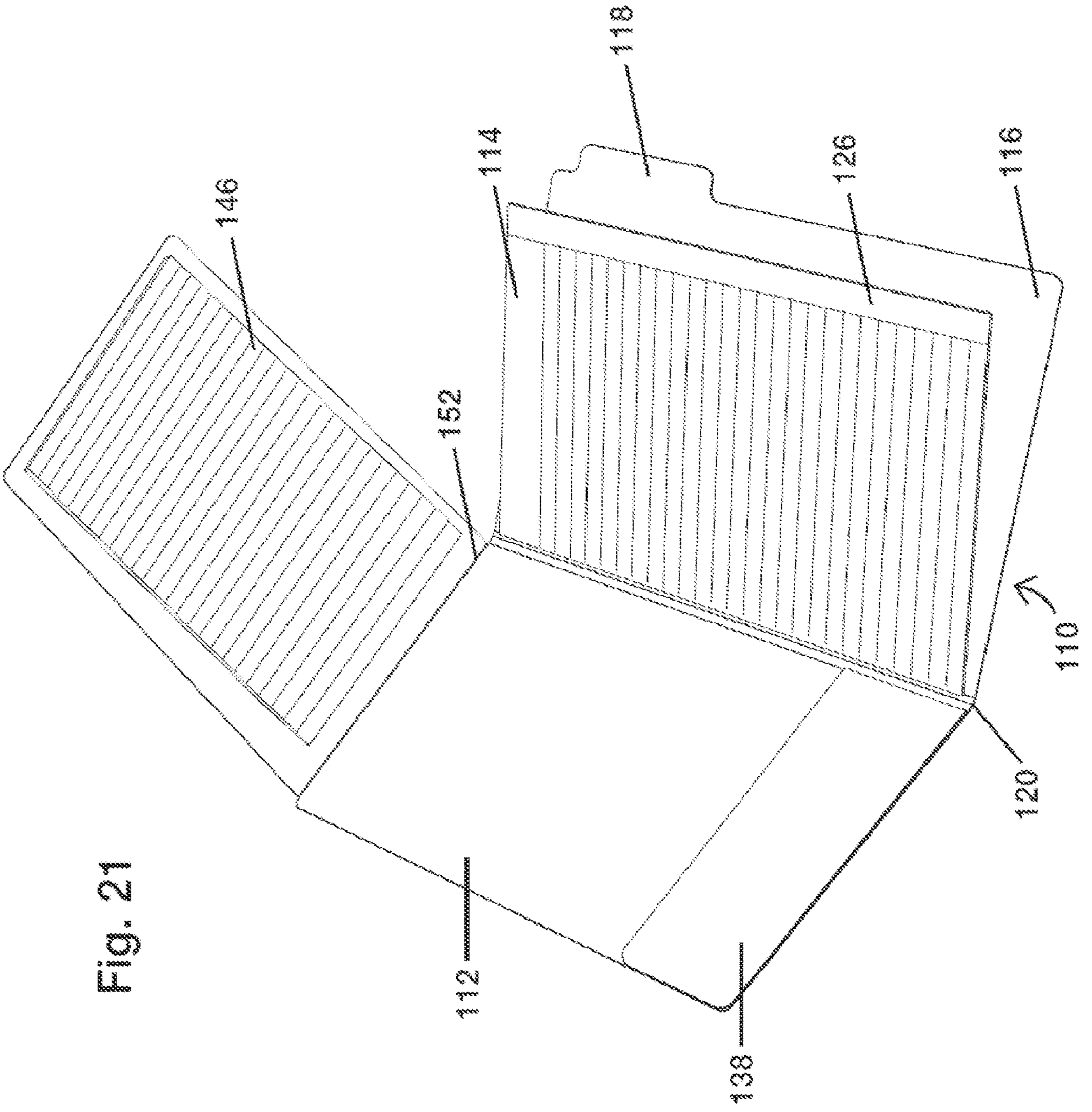
FIG. 21 shows a modified bound component of FIG. 20 having an additional portion extending off of the front cover and with the additional portion having a plurality of pages attached.

FIG. 19 shows a bound component with front cover 112, back cover 116, and spine 120. A plurality of pages 114 may be bound to spine 120. The inside of front cover 112 and or back cover 116 may have one or more pockets 134, 136, 138, 140, and/or 142. The one or more pockets may be sized to hold business cards or the like such as pocket 140. One or more pockets may be side loading. The one or more pockets may be formed from one or more corner tabs such as 134. The one or more pockets may be designed to hold different sized note cards such as 142 and 144. Pocket 142 may be up to half the size of pocket 144. The pocket could be a traditional folder pocket 138 or a larger pocket 136. The pocket may be up to 1/10 the size of the front or back cover, up to 1/4 the size of the front or back cover, up to 1/26 the size of the front or back cover, and/or up to 3/4 the size of the front or back cover. The pocket 134, 136, 138, 140, and/or 142 size and/or shape will be chosen based on manufacturing preferences.

Figure 22:
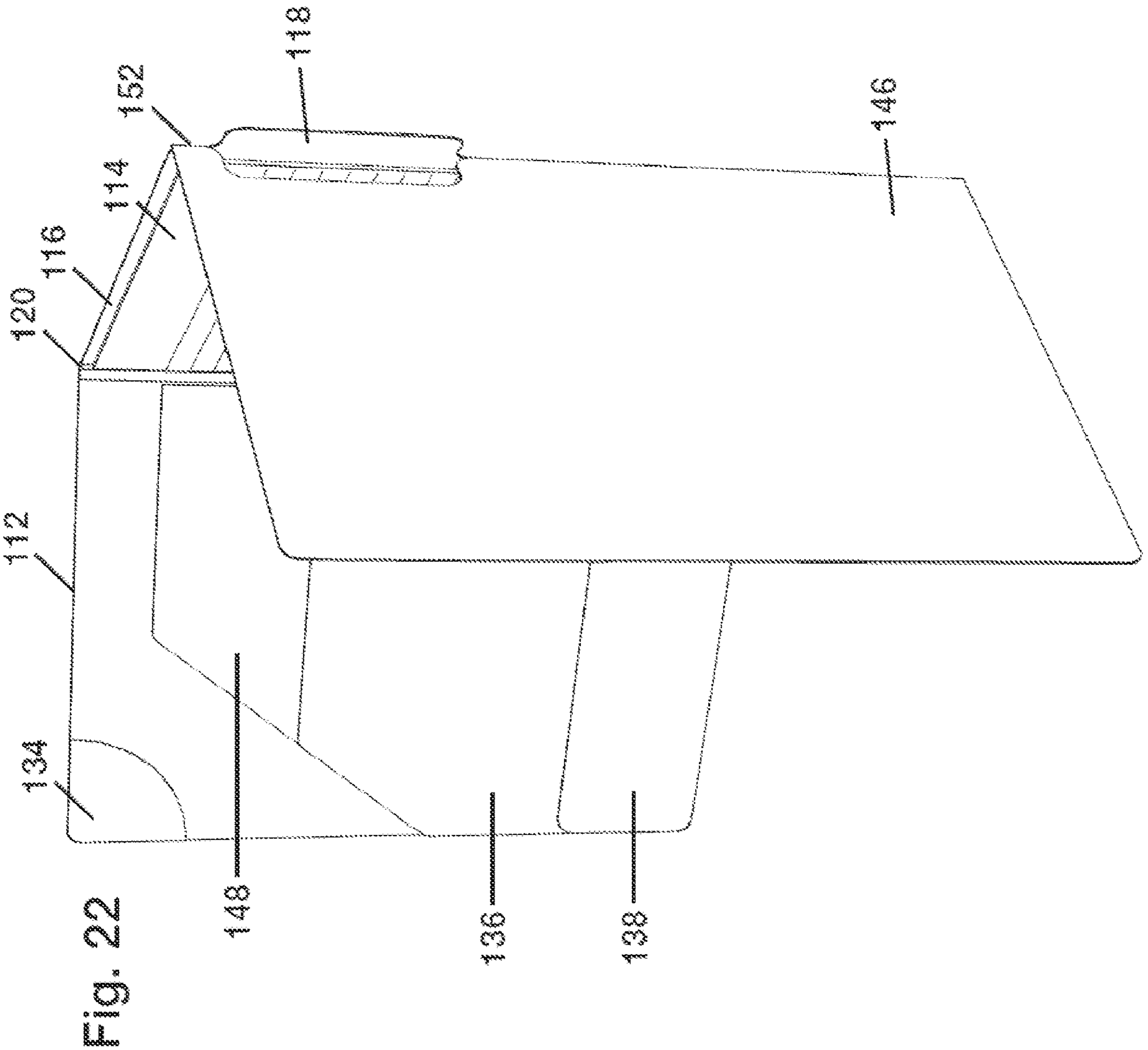
FIG. 22 shows another modified version of the bound component of FIG. 20 having the additional portion extending off of the rear cover and having the tab cut out and resting between the sections of the bound component.
Figure 23:
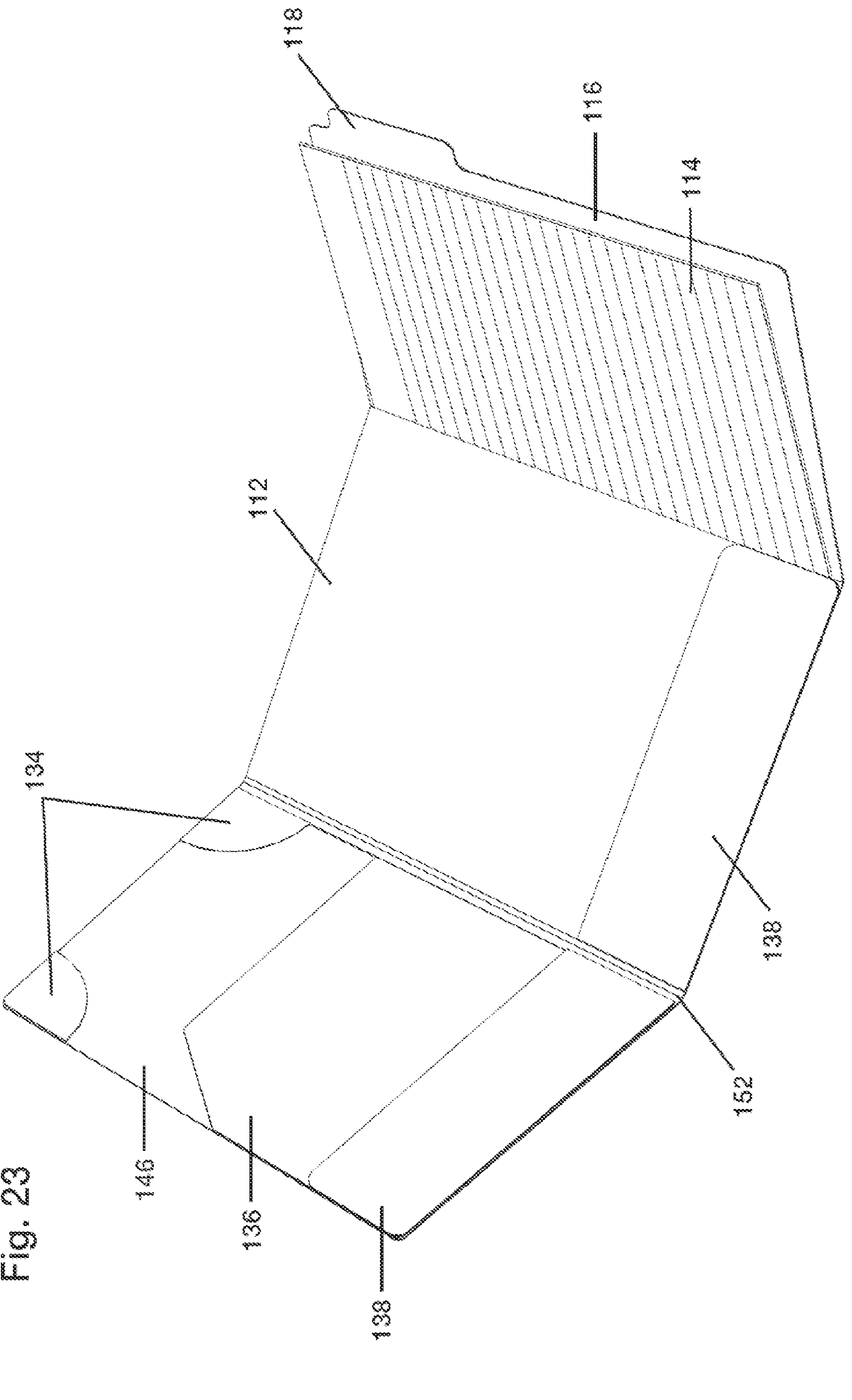
FIG. 23 shows another modified version of the bound component of FIG. 20 having an additional portion extending off of the front cover of the bound component.

It is to be understood that the bound component could have one or more additional sides 146 at fold line 152 attached to the front cover 112 or back cover 116 that may also contain pockets 134, 126, 138, 140, 142 and/or 144 and or a plurality of pages 114. Such a bound component is depicted in FIGS. 20, 21, 22 and 23. The plurality of pages 114 may be bound to the one or more additional sides using staples, adhesive, string, cord, yarn or the like. The plurality of pages 114 may be non-permanently bound to the one or more additional sides by using a slot to hold in a backing portion to the plurality of pages or a portion of the plurality of pages themselves. The plurality of pages 114 may contain one or more of the following or a combination of the following: sticky notes of various sizes, lined paper, calendar pages, graph paper or any of the other types of pages. It is to be understood that the additional side 146 may fold inward so as to preserve the shape and size of the bound component 110 for storage purposes. It is to be further understood that tab 118 as depicted in FIG. 22 may comprise fold lines and or cut outs at its base as manufacturing preferences dictate so it lays flat when unfolded.

The pockets 134, 136, 138, 140, and/or 142 may be formed from a plastic substrate, and/or a paper substrate. The materials may be treated or coated based on manufacturing preferences. The bound component may be a traditionally sized and shaped file folder. The bound component may be made of a plastic substrate or a paper substrate, or either type of substrate treated and/or coated based on manufacturing preferences. The tabs may be integral to the back cover 116 or they could be sealed, adhered, attached thereto. The tabs 118, 130 may be permanently deployed or optionally deployable as disclosed in U.S. application Nos. 61/038868; 61/086550; Ser. No. 12/264630; 12/392183; 12/420444. The tabs 118, 130 may be located at the top or bottom end of the bound component, or located apart from the top or bottom ends of the bound component. If located near an end of the bound component, for example as shown with tab 118 at an upper end as in FIG. 22, fold line 152 may extend to the adjacent end of the bound component; however if tab 118 is close to the adjacent end, the fold line 152 may be omitted between tab 118 and the adjacent end.

The plurality of pages 114 may be one or more of the following or a combination of the following: lined paper, graph paper, drawing paper, blank paper, calendar pages and/or carbon copy paper. The plurality of pages 114 may be traditional sized letter paper, legal paper, or other sized paper. The front cover 112 and rear cover 116 may be sized to approximately the size as the plurality of pages 114 contained within. The plurality of pages may include one or may pages having a section for notes (lined or unlined), and one or more of the following: a section for meeting attendees, date, time, topic, objectives, action items, page, color coded sections, to-do-list, sections identified by day or date, and/or numbered lines. The plurality of pages may include one or more personal record sheets, such as health information, property (home, car, land etc. . . . ) information, insurance information, financial information, contact information, or other such information of a personal nature. The section for notes may be at the top of the plurality of pages, at the side, on the right side, or at the bottom. There could be one or more plurality of pages bound to the bound components at one or more of the following locations, spine 120, the inside of front cover 112, and or the inside of back cover 116. For example, a plurality of pages 114 containing one or more types of calendar type information could be bound to the inside of front cover 112 and a plurality of pages 114 with lined note paper could be bound to the spine 120. It is to be understood the binding location may be adjusted as well as the type of pages contained within the plurality of pages 114.

The bound mechanism may be slightly larger than the plurality of pages so as to better protect the plurality of pages from damage. The front cover 112 and/or rear cover 116 may have one or more pockets on their outer surface (the cover surface not touching the plurality of pages 114). The outer surface of the front cover 112 or the back cover 116 may have a plastic sheet attached to the cover on one or more sides, on two or more sides or on less than four sides, such that a sheet of paper or other material may be protectively held between the plastic sheet and the outer side of the front cover 112 or back cover 116. The outer or inner surfaces of front cover 112 and/or rear cover 116 may have one or more areas where the user can record content information. The tabs 118, 130 and or the front cover 112 and or the back cover 116 may be made of a non-porous material and may be able to be marked upon as disclosed in U.S. application Ser. Nos. 10/828073 and 10/962724.

It is to be understood that the bound component may have one or more additional sides 146 at fold line 152 attached to the front cover 112 or back cover 116 that may also contain pockets 134, 126, 138, 140, 142, 144 and/or 148 and or a plurality of pages 114. Such a bound component is depicted in FIGS. 20, 21, 22 and 23. The plurality of pages 114 may be bound to the one or more additional sides using staples, adhesive, string, cord, yarn or the like. The plurality of pages 114 may be non-permanently bound to the one or more additional sides by using a slot to hold in a backing portion to the plurality of pages or a portion of the plurality of pages themselves. The plurality of pages 114 may contain one or more of the following or a combination of the following: sticky notes of various sizes, lines paper, calendar pages, graph paper or any of the other types of pages. It is to be understood that the additional side 146 may fold inward so as to preserve the shape and size of the bound component 110 for storage purposes. It is to be further understood that tab 118 as depicted in FIG. 22 may comprise fold lines and or cut outs at its base as manufacturing preferences dictate so it lays flat when unfolded.

Figure 24A:
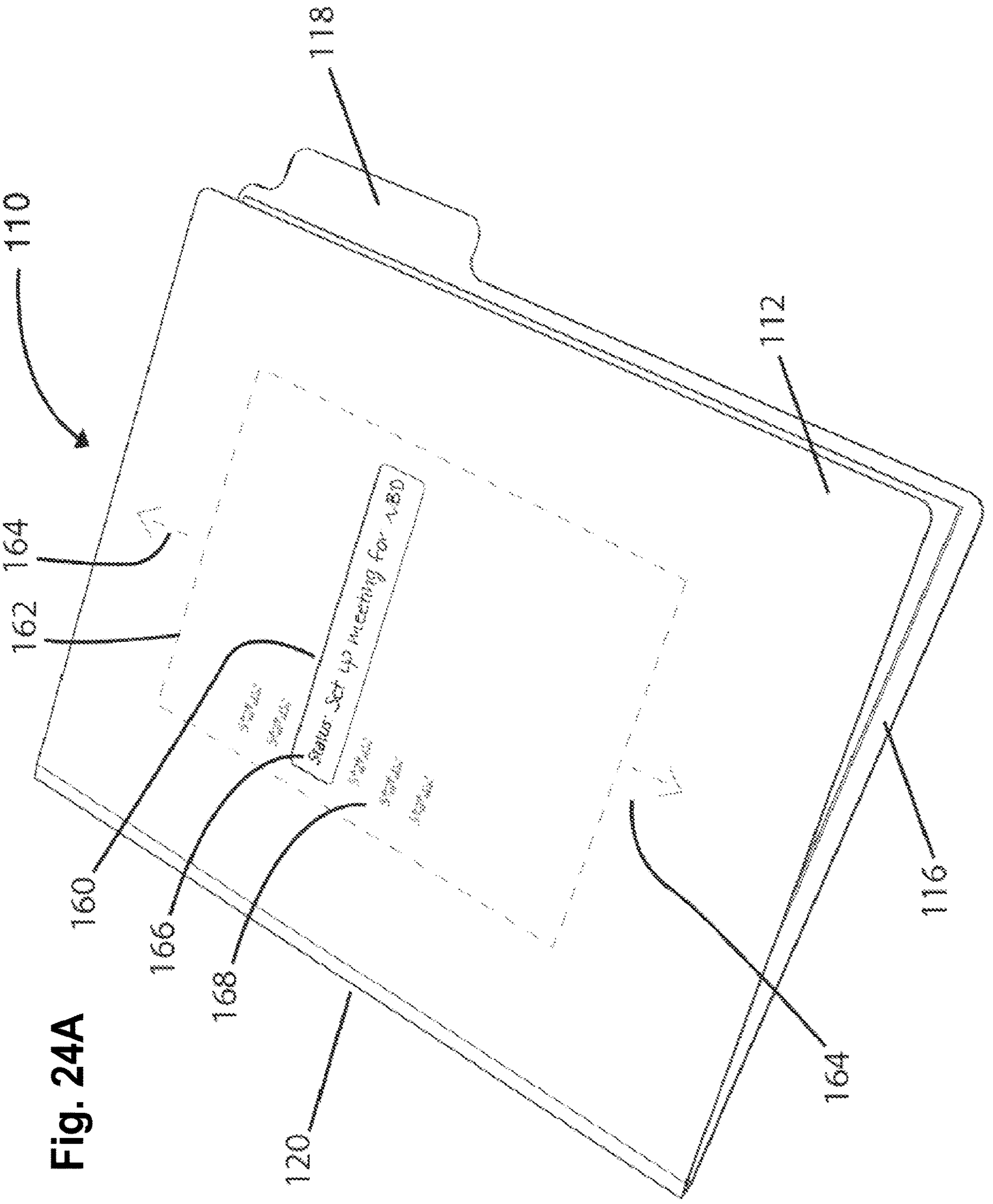
FIGS. 24A and 24B show bound components having a window through which information may be viewed.

FIG. 24A shows another bound component generally designated 110, which may include a front cover 112, a plurality of pages, and a rear cover 116, with the front cover 112 and rear cover 116 pivotally coupled to spine 120. One or both of the covers may have one or more windows 160 for displaying information. As shown in FIG. 24, front cover 112 comprises window 160 through which information 166 may be viewed, such as "Status: set up meeting. . . ." The information 166 may be printed or written onto card 162, which may slide relative to window 160 (as indicated by arrows 164), so as to make selectively visible various information, for example a list of phrases 168. In FIG. 24A this sliding movement is shown generally parallel to the length of the front cover 112, but it could likewise be parallel to the width of the front cover, or even in a diagonal direction. The card 162 may be held behind or within front cover 112, for example in a sleeve or pocket (not shown in FIG. 24A.)

Figure 24B:
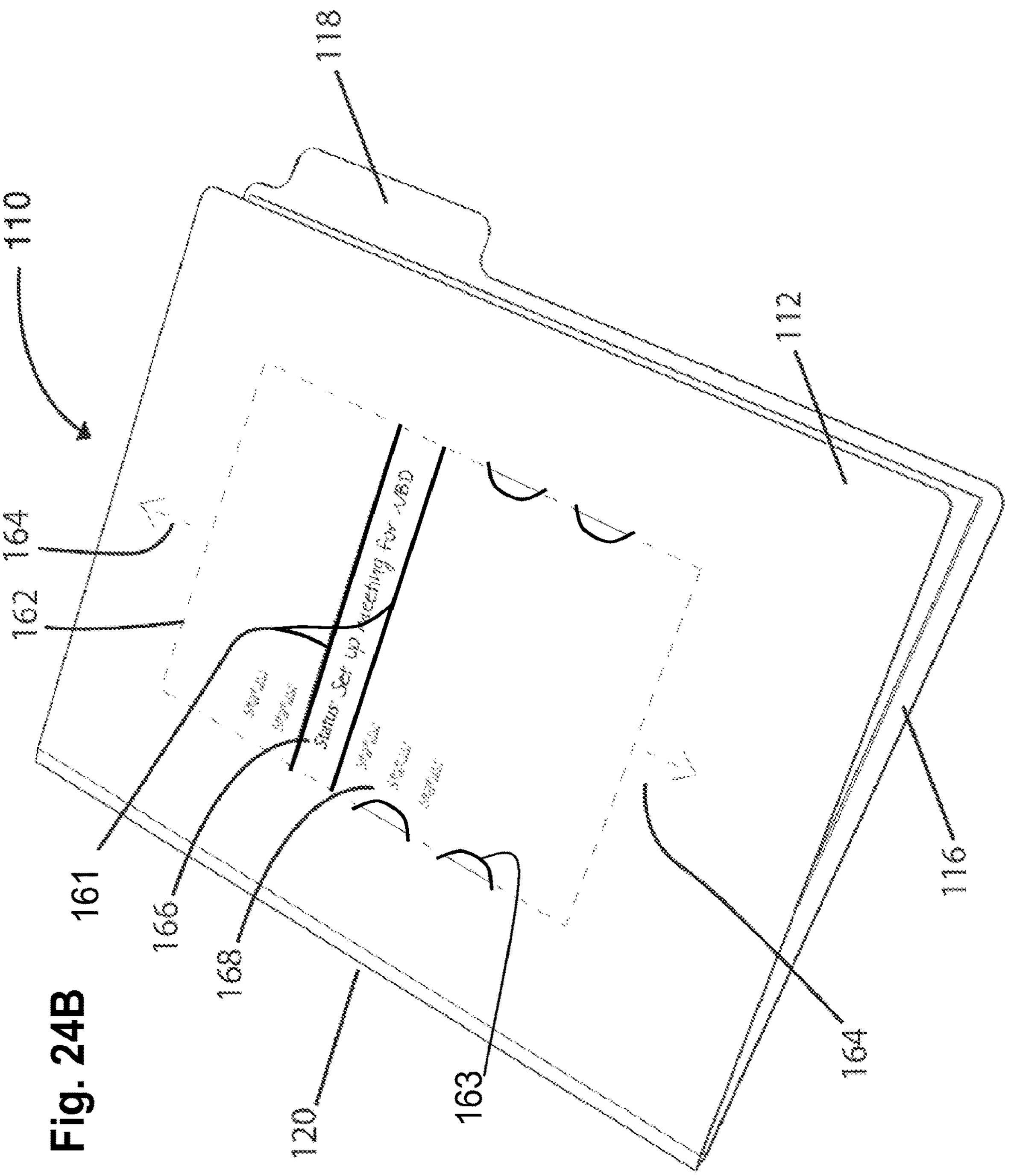

FIG. 24B shows another bound component somewhat similar to that in FIG. 24A and with similar features already described. One or both of the covers may display information 166, for example printed or written onto card 162, which may slide relative to the cover (as indicated by arrows 164), so as to make selectively visible various information, for example a list of phrases 168. In FIG. 24B this sliding movement is shown generally parallel to the length of the front cover 112, but it could likewise be parallel to the width of the front cover, or even in a diagonal direction. The card 162 may be held behind or within front cover 112, for example moving through view slits 161 so that selected information 166 becomes visible. Card 162 may be held or guided in its movement by one or more guide slits 163 of any suitable shape.

Figure 25A:
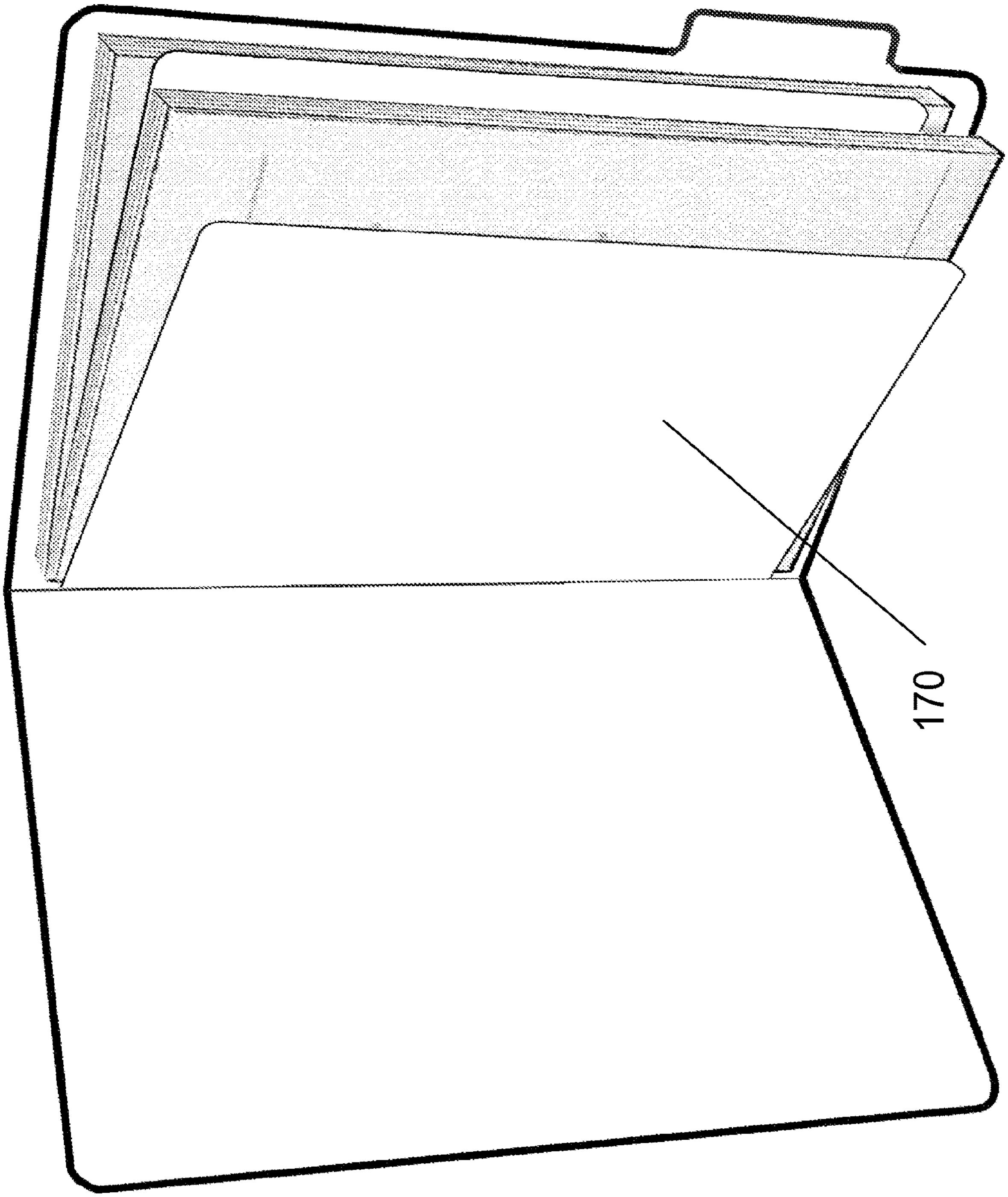
FIGS. 25A-25D show bound components having internal dividers.
Figure 25B:
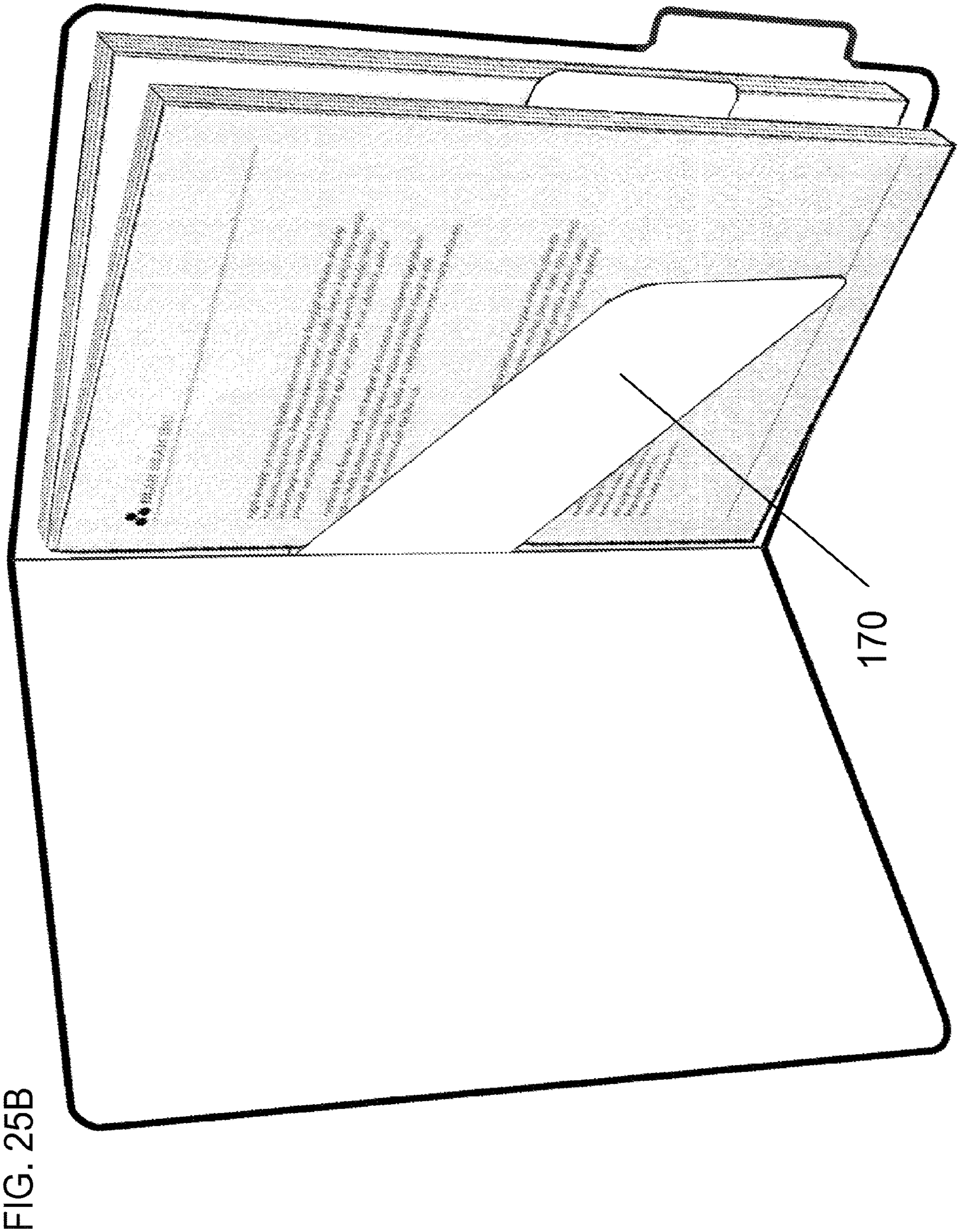
Figure 25C:
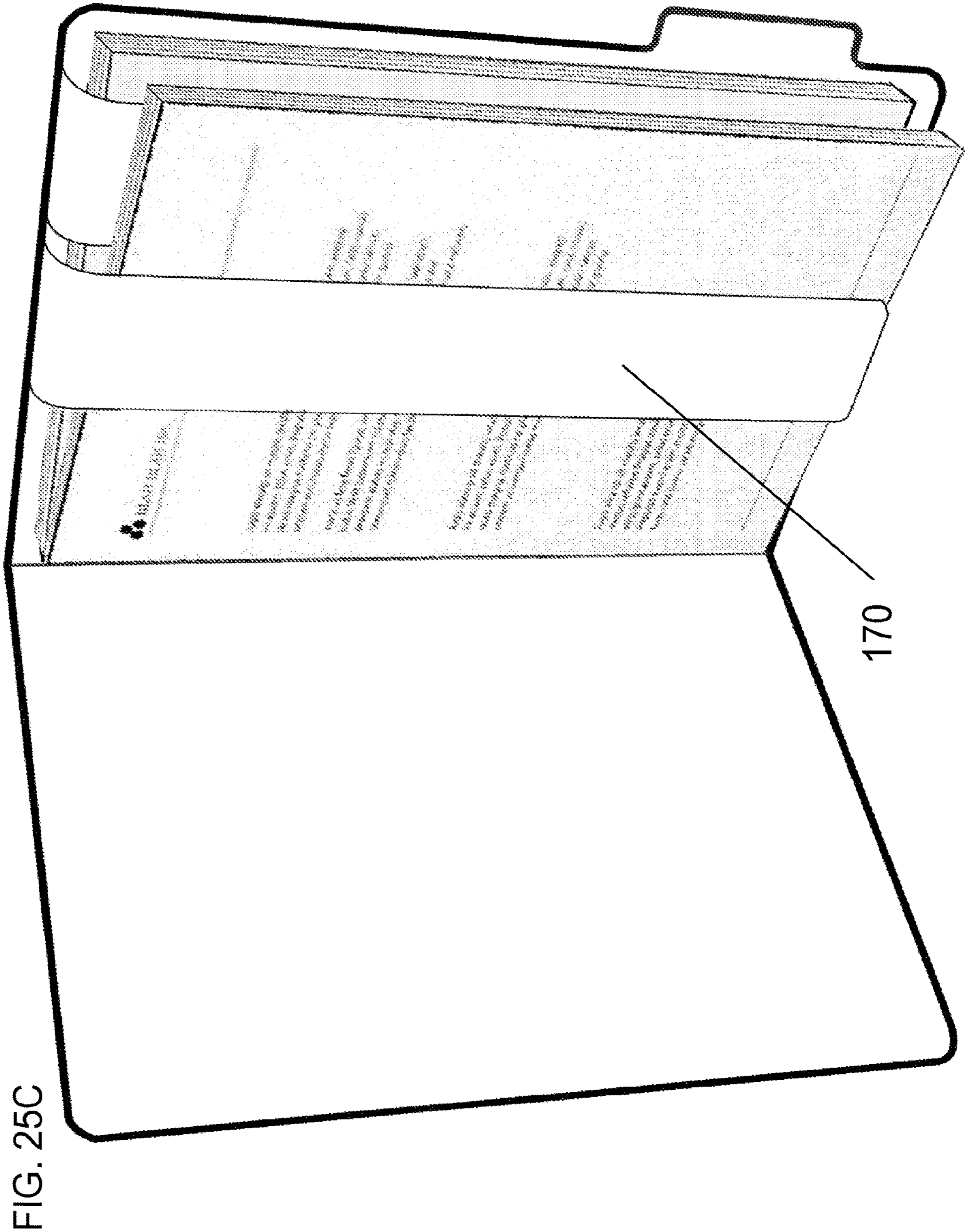
Figure 25D:
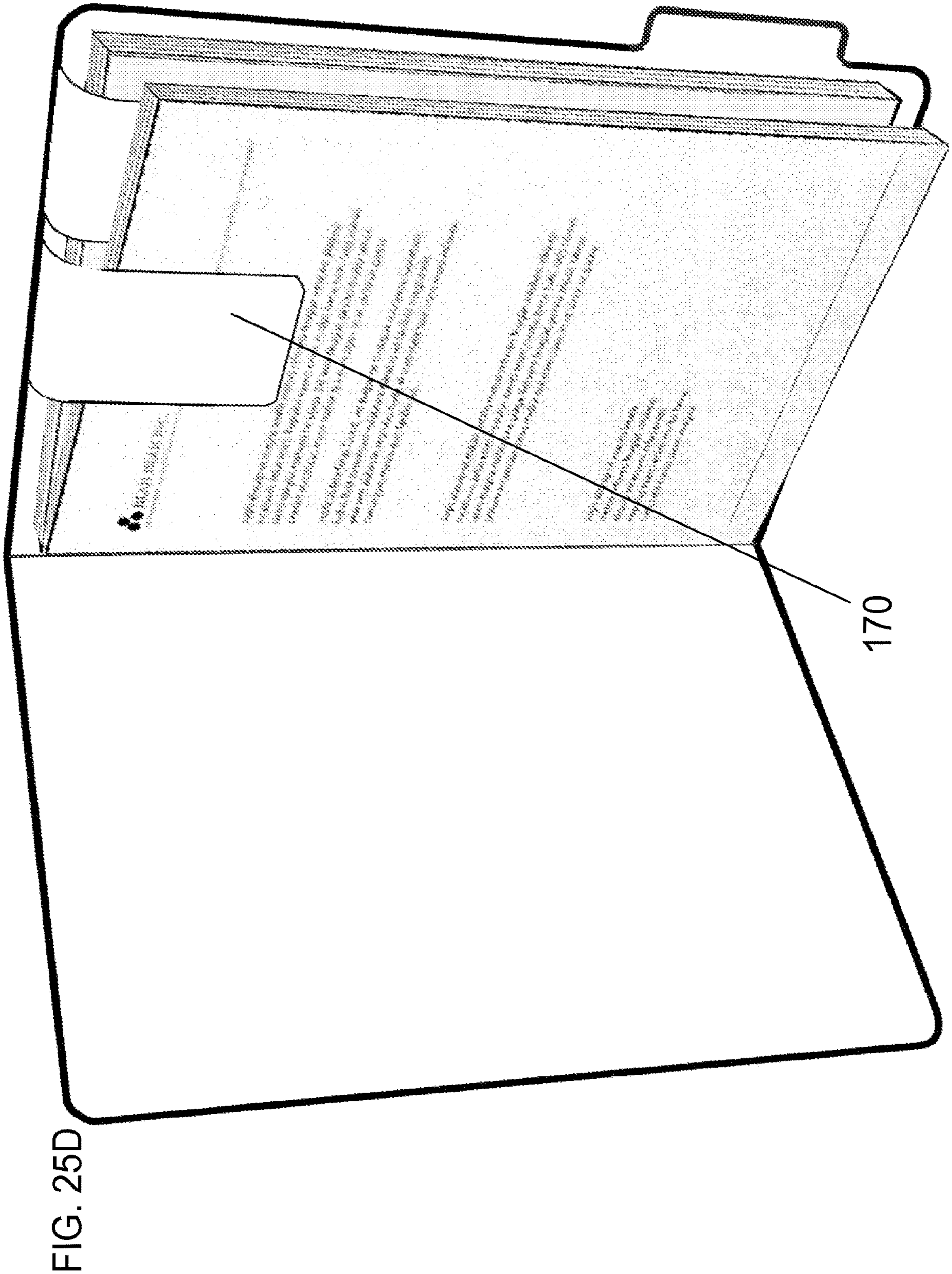

The bound component may comprise a plurality of pages attached thereto along with one or more internal dividers 170 as shown in FIGS. 25A-25D. The one or more internal dividers may be about the same size as the front and or back cover as shown in FIG. 25A. The one or more internal dividers may be smaller than the front and/or back covers as shown in FIGS. 25B-25D. The one or more internal dividers may be a third of the size of the front and/or back covers as shown in FIGS. 25B and 25C, or smaller as shown in FIG. 25D. The one or more internal dividers may be attached to the bound component along a bound edge as shown in FIGS. 25A and 25B. If the internal dividers arc initially separate from the bound component, attachment to the bound component may be by any suitable means such as stapling, gluing, welding, stitching, riveting, and the like. Alternately the internal dividers may be created as a part of the bound component, such as a part of one or both covers, and attached thereto by folding or creasing. The one or more internal dividers may be attached to the bound component along a free edge as shown in FIGS. 25C and 25D; these dividers may be foldably or hingedly attached to the bound component by any suitable means and may be formed from the same piece of material or from a separate piece of material. Any of the dividers described may be formed from the same material as other parts of the bound component, or may be formed separately and attached later. The one or more internal dividers may have one or more identification tabs. The one or more identification tabs may be optionally deployable.

The bound component may be similar to a traditional file folder. Such a component may have a pocket attached thereto to hold loose papers. Said pocket may be removable using such attachment means such as hook and loop fastener; removable adhesive; or other suitable materials. Said pocket may contain gussets along the side or bottom.

Figure 26B:
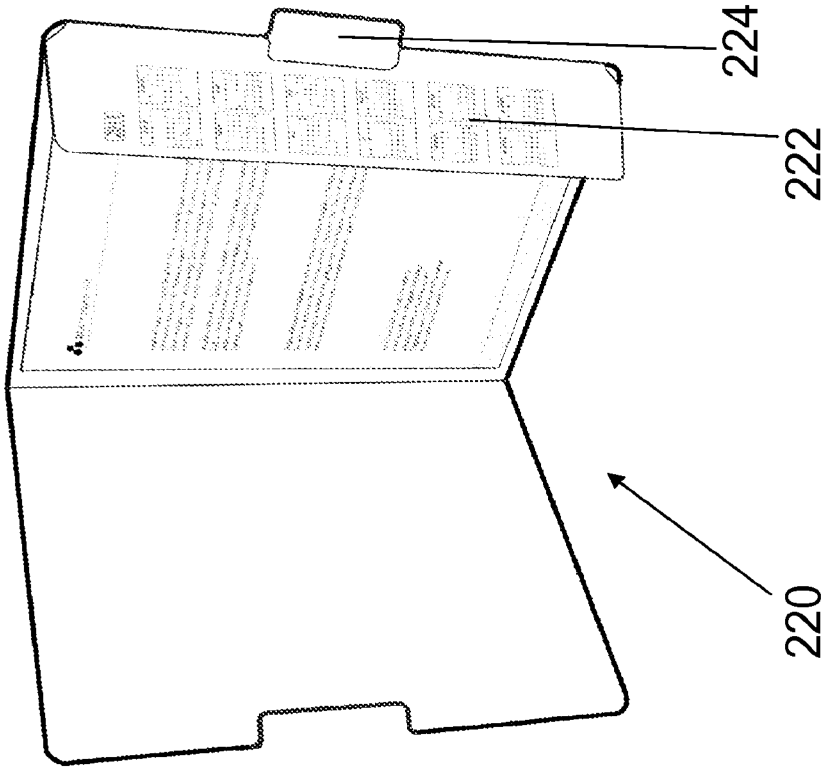
FIGS. 26A-26B show a folder with an extension panel.
Figure 26A:
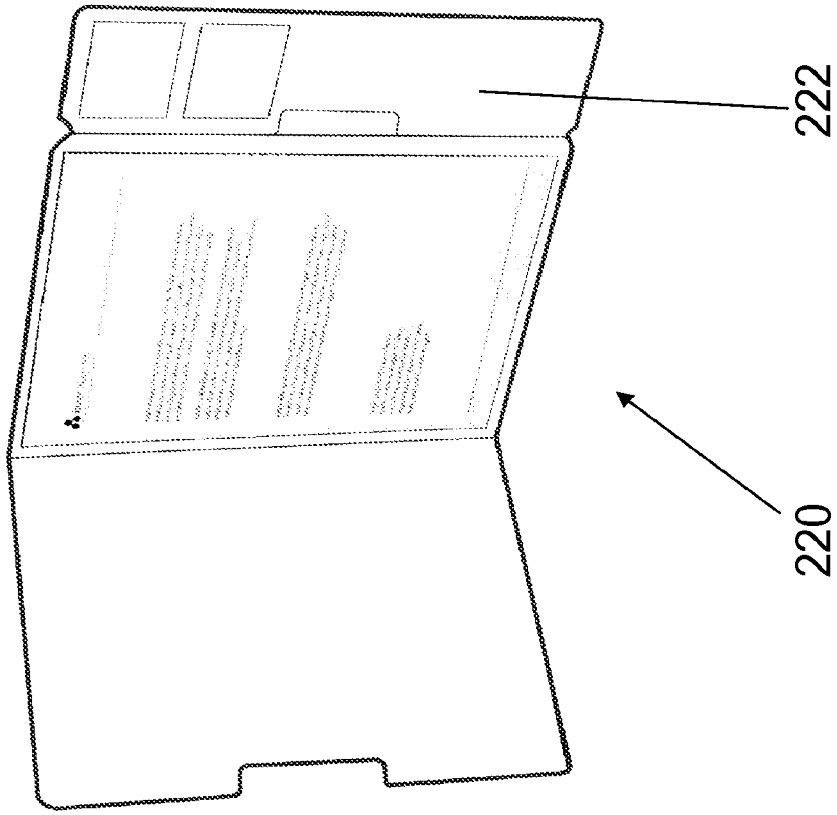

It is to be understood that many of these contemplated features would apply to a traditional file folder as well. As shown in FIGS. 26A-26B, in such a design the extension panel 222 may serve as additional security to retain papers in a folder 220. Such a folder may have a plurality of pages bound to it. The extension panel 222 may serve as a security flap and may have information printed on it such as a to-do list, calendar, or any of the other features discussed herein or similar to those suggested herein. The extension panel 222 may have post it notes on the surface as shown. The extension panel may be moved from an open or extended position as shown in FIG. 26A, to a closed position as shown in FIG. 26B. A tab 224 may be provided adjacent to the extension panel 222.

While certain embodiments are described herein as "bound" components having pages bound therein, for example with pages held by binding mechanism 122 as shown in FIGS. 10, 11, 13, 15, and 18, it should be understood that some of the embodiments would also be useful to hold unbound pages therein. For example, the folder structures shown in FIGS. 9 through 26B may hold pages even if a binding mechanism such as binding mechanism 122 is not provided. The internal dividers 170 of FIGS. 25A-25D may be used for dividing either bound or unbound pages, and the extension panel 22 of FIGS. 26A-26B may be used with either bound or unbound pages. For instances where pages are not bound to the components, the components may be provided either with loose papers, or with no papers at all.

Having described the inventions in detail herein, it will be apparent that modifications and variations thereof are possible without departing from the scope of the inventions. It is to be understood that the bound component modifications and variations discussed herein could be used interchangeably with the various bound components described throughout this application.

The invention claimed is:

1. A bound component comprising:
- a front cover;
- a back cover;
- a spine connected to the back cover along a side of the back cover;
- a first pocket panel connected to the spine, the first pocket panel forming a first pocket opening between the first pocket panel and the back cover;
- a second pocket panel connected to the first pocket panel, wherein a second pocket opening is formed in between the first pocket panel and the second pocket panel; and
- a closure flap having a first end attached to the back cover and having a securement end configured to be removably secured to an attachment point on the front cover,
- wherein a portion of the first pocket opening and a portion of the second pocket opening are oriented perpendicular to a length of the spine; and
- wherein the bound component further comprises one or more dividers within the first pocket opening and wherein the first pocket opening is expandable and two side edges of the first pocket panel are connected to the back cover by expandable gussets.

2. The bound component of claim 1 wherein the closure flap is secured to an outside surface of the front cover.

3. The bound component of claim 2 wherein the closure flap removably attaches to the outside surface of the front cover by a hook and loop fastener, one or more magnets, a reattachable adhesive, a bungee cord, a tie, a clasp, a button, a clip, a hook, a ring, a snap, or a zipper.

4. The bound component of claim 2 wherein the second pocket opening is formed between an external side of the first pocket panel and an internal side of the second pocket panel.

5. The bound component of claim 1 wherein the bound component is formed from one or more of a fabric, a plastic, a paper or a vinyl material.

6. A storage component comprising:
- a back panel;
- a front panel;
- a spine connected to the back panel along a side of the back panel;
- a first pocket panel connected to the spine, the first pocket panel forming a first pocket opening between the first pocket panel and the back panel;
- a second pocket panel connected to the first pocket panel, wherein a second pocket opening is formed in between the first pocket panel and the second pocket panel; and a closure flap having a first end attached to the back panel and having a securement end configured to be removably secured to an attachment point on the front panel, wherein a portion of the first pocket opening and a portion of the second pocket opening are oriented perpendicular to a length of the spine, and wherein the storage component further comprises one or more dividers within the first pocket opening and wherein the first pocket opening is expandable and two side edges of the first pocket panel are connected to the back panel by expandable gussets.

* * * * *